(12) United States Patent
Yee

(10) Patent No.: US 7,677,832 B2
(45) Date of Patent: *Mar. 16, 2010

(54) PRECAST CONCRETE SLAB SYSTEM AND METHOD THEREFOR

(75) Inventor: Alfred A. Yee, Honolulu, HI (US)

(73) Assignee: Kwik Slab, LLC, Honolulu, HI (US)

( * ) Notice: Subject to any disclaimer, the term of this patent is extended or adjusted under 35 U.S.C. 154(b) by 726 days.

This patent is subject to a terminal disclaimer.

(21) Appl. No.: 11/529,585

(22) Filed: Sep. 29, 2006

(65) Prior Publication Data

US 2007/0081858 A1   Apr. 12, 2007

Related U.S. Application Data

(63) Continuation-in-part of application No. PCT/US2005/010306, filed on Mar. 28, 2005.

(51) Int. Cl.
*E01C 5/08* (2006.01)

(52) U.S. Cl. ............................... 404/40; 404/49; 404/62

(58) Field of Classification Search .................. 404/40, 404/47, 49, 50, 56, 62, 63, 70, 72; 52/586.2, 52/592.1; 403/292, 381, 375
See application file for complete search history.

(56) References Cited

U.S. PATENT DOCUMENTS

| | | | |
|---|---|---|---|
| 1,237,542 | A | 8/1917 | Morgal |
| 1,991,931 | A | 2/1935 | Kling et al. |
| 4,145,153 | A | 3/1979 | Fasullo et al. |
| 4,362,426 | A | 12/1982 | Ruckstuhl |
| 4,619,096 | A | 10/1986 | Lancelot, III |
| 5,230,191 | A | 7/1993 | Mayrand |
| 5,548,938 | A | 8/1996 | Scheiwiller |
| 5,626,289 | A | 5/1997 | Demers et al. |
| 5,682,635 | A | 11/1997 | Tolliver et al. |
| 6,058,672 | A | 5/2000 | McClellan |
| 6,571,452 | B1 | 6/2003 | Wang |
| 6,607,329 | B2 | 8/2003 | Smith |
| 6,622,442 | B2 | 9/2003 | Kwon |
| 6,659,677 | B1 | 12/2003 | Expósito |

(Continued)

FOREIGN PATENT DOCUMENTS

EP   0 098 099   1/1984

OTHER PUBLICATIONS

"Super-Slab", The Fort Miller Co., Inc. (date unknown).

*Primary Examiner*—Gary S Hartmann
(74) *Attorney, Agent, or Firm*—Jacobson Holman PLLC

(57) ABSTRACT

A pre-fabricated concrete slab system and method have matching rectangular slabs with cooperatively fitting male and female type connectors which fit adjacent to each other in a checkerboard fashion. The slabs include spaced reinforcing rods extending longitudinally and transversely therethrough. In at least some of the slabs, the rods' distal ends protrude outwardly away from one or more side edges of the slabs to form a plurality of male connectors. Correspondingly, at least some of the slabs include a plurality of corresponding female sockets on one or more sides thereof, each female socket receiving a corresponding male connector when dropped therein. Through interconnection of corresponding female sockets and male connectors by steel reinforcing bars extending in both the longitudinal and transverse directions, a continuous tension reinforcement is established between adjacent slabs in both the longitudinal and transverse directions.

25 Claims, 26 Drawing Sheets

U.S. PATENT DOCUMENTS 6,663,315 B2 12/2003 Smith
6,802,168 B1 10/2004 Minnick
6,952,905 B2 10/2005 Nickel et al.
7,134,805 B2 * 11/2006 Yee .............................. 404/50
2002/0170259 A1 11/2002 Ferris

* cited by examiner

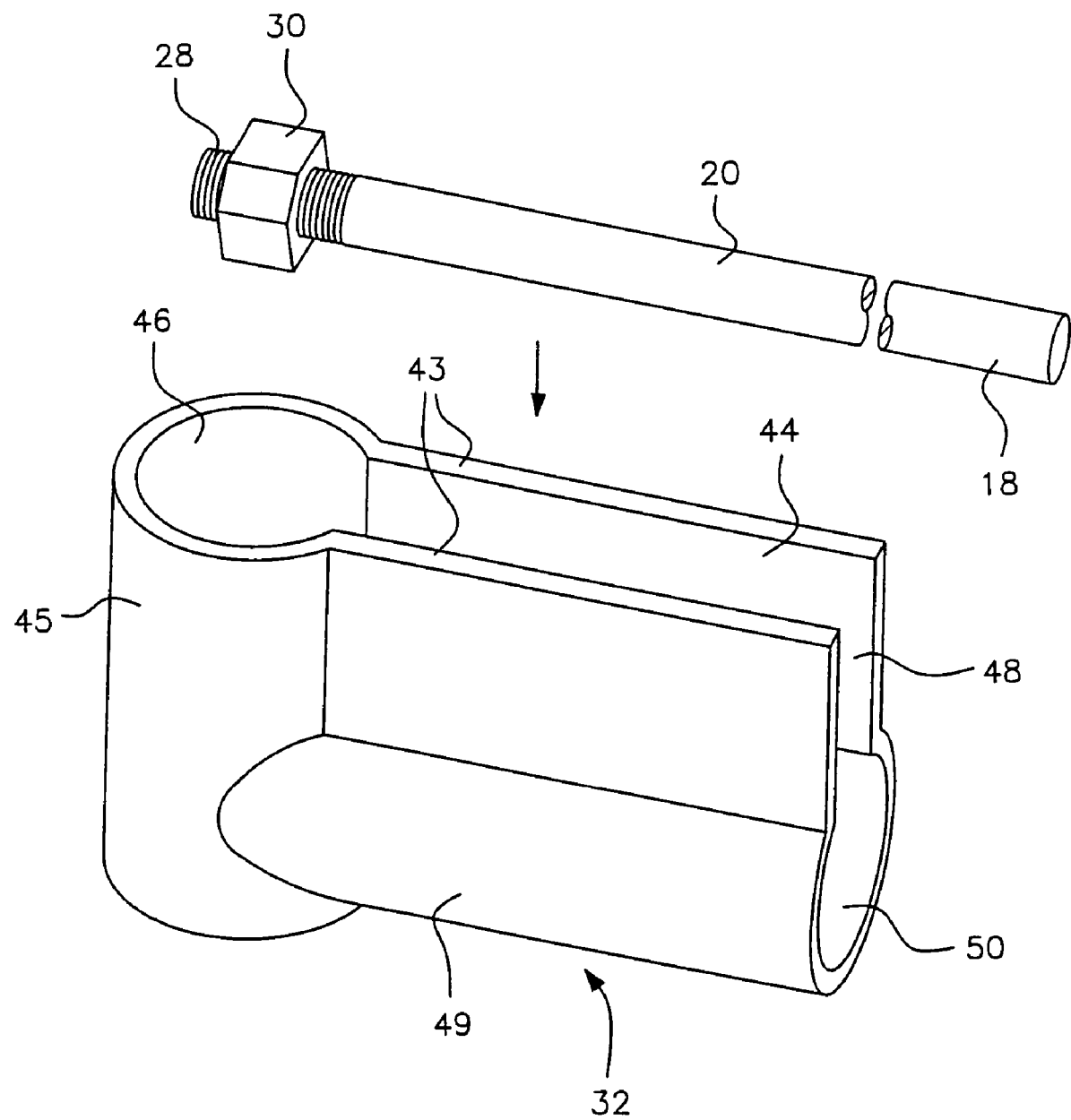

→ E          F ←

PRECAST CONCRETE SLAB SYSTEM AND METHOD THEREFOR

This application is a continuation-in-part application of co-pending international application, PCT/US05/10306, filed Mar. 28, 2006, and designating the U.S., the priority of which is hereby claimed. The priority PCT application, in turn, claimed priority from co-pending U.S. patent application Ser. No. 10/814,583, filed on Apr. 1, 2004, the priority of which is also claimed.

BACKGROUND OF THE INVENTION

1. Field of Invention

The present invention relates generally to pre-fabricated concrete slabs or other forms that can be rapidly connected and used for repairs on highway pavements, roadways and parking lots, bridge decks, aircraft runways, taxiways, buildings, floors, roofs, or any structure made using precast concrete forms. More specifically, the present invention is directed to an interlocking system that allows the precast slabs or forms to be quickly and easily set tightly joined together, while maintaining continuous tension reinforcement in two dimensions and with a minimum of grouting and alignment.

2. Discussion of the Related Art

Concrete structures are known to wear, deteriorate, settle and crack over time with continuous use as well as due to exposure to traffic, weather and extremes of temperature. A good example of this type of structure is a concrete roadway. One of the faster methods of repairing concrete roadways is through the use of precast concrete slabs. The damaged area of pavement is excavated and cleared and the subgrade is prepared. The concrete slabs are then positioned over the damaged area and dropped into place. It is well known that such concrete slabs can be created so that they are interconnectable. Examples of such art can be found in U.S. Pat. Nos. 1,991,931, 4,362,426, 5,626,289, 5,682,635, 6,607,329 and U.S. Patent application Serial. No. 2002/0170259.

One of the problems with the prior art concrete slabs is the inability of the slabs to provide for tension in two dimensions. For example, in the Kling et al. patent (U.S. Pat. No. 1,991,931) the slabs have interlocking tabs but they do not provide for continuous tensile forces between the precast panels, nor do they provide sufficient shear resistance between panels. The Ruckstuhl patent (U.S. Pat. No. 4,362,426), on the other hand, does appear to provide tension in two dimensions. However, the Ruckstuhl structure lacks simplicity. The connection hardware consists of a plate and screws which are inset into the precast slab, and the system uses highly precisioned complex metal parts that allow little tolerance and are impractical in the field.

A similar problem is found with the structure of the Tolliver et al. patent (U.S. Pat. No. 5,682,635). The nature of the Tolliver connection requires perfect precision, as the screw threads in the form will not be executable unless the positioning and alignment of the male and female parts are exactly true. This must be the case for every single connecting bolt, and in concrete construction in the field, this is practically impossible. Even if a user were to manage to line up one bolt and execute the connection, the next connection must also be lined up perfectly in order that the screw threads can be threaded. From a practical use standpoint, this is not ordinarily possible on a real road situation, certainly not one that seeks repair in a matter of hours. The structure of the Smith patent (U.S. Pat. No. 6,607,327) does evidence some tensile strength in two dimensions, however, it is relatively weak and does not realize the benefit of using continuous tensile steel to anchor the connectors in two dimensions.

As such, there is a need in the industry for precast concrete slabs which may be laid down so that traffic can resume in the damaged area in a matter or hours. The slabs must be strong, have satisfactory strength in two dimensions and be able to be leveled and grouted with cement mortar.

Furthermore, there is also a need in the industry to be able to construct buildings and other structures using precast connecting forms that allow for full tension in two dimensions between connecting concrete parts providing tension in two dimensions and with the added strength of steel reinforcing bars throughout the length of the form, and with a minimal amount of grouting and alignment.

SUMMARY OF THE INVENTION

The present invention comprises a prefabricated concrete slab system having a plurality of prefabricated rectangular concrete slabs with each slab having a plurality of reinforcing elements that extend both longitudinally and transversely through the slab. The plurality of reinforcing elements in at least a first slab project beyond one or more side edges of the first slab to form spaced male connectors, while at least a second slab has a plurality of female socket fixtures spaced along one or more side edges thereof that are open on the top surface. The male connectors along the at least one side edge of the first slab are received in corresponding female socket fixtures along the at least one side edge of the second slab through the socket fixture openings. Once the male connectors are positioned in their corresponding female socket fixtures, cementious filler is added into the female socket fixtures. When solidified, the filler rigidly fixes the male connectors in the female socket fixtures and provides continuous reinforcement between the reinforcing elements of the first and second slabs.

According to a first embodiment, the present invention includes a plurality of male type prefabricated concrete slabs and female type prefabricated concrete slabs which can be quickly and easily fitted to each other in a checkerboard fashion for repair to roadways, airplane runways and other applications where concrete slabs can be typically used. The prefabricated male and female slabs are each individually reinforced by metal rods which extend therethrough in both longitudinal and transverse directions and are interconnected along each side by a plurality of male and female connectors, which serve to reinforce the assembled slab system continuously in both the longitudinal and transverse directions.

The male type prefabricated concrete slabs have a series of spaced reinforcing rods which run through the slab in a first (longitudinal or X) direction parallel to two opposite sides of the slab and a second series of spaced rods of a similar construction running in a second (transverse or Y) direction perpendicular to the longitudinal direction and parallel to the two other opposite sides of the slab. These reinforcing rods protrude beyond the lateral edges on one to four sides of the slab for several inches, in the range of 5-10 inches depending on the size of the reinforcing rods required, and are fitted at the distal ends with a head or similar fixture which is wider than the diameter or width of the rod. The rods are made of steel or other material typically used as reinforcement for concrete slabs. The projecting rod end with the distal end or similar fixture extending beyond the sides of the male slabs serve as the male connector of the concrete slab connector system of the present invention.

The female type prefabricated concrete slabs have a plurality of female connector sockets or socket fixtures positioned on one to four sides of the female slab, each at a location to correspond to one of the male connectors of the male slab. The female connector sockets or socket fixtures are open on the top to allow the male connectors of a male slab to drop into the female connector sockets when the male slab is lowered into position alongside one or more female slabs. As such, with four adjacent female slabs, all of the male connectors on each side of the male slab project into corresponding female connector sockets on one side of the four adjacent female slabs.

The female socket fixtures at corresponding positions on opposite sides of the female slab are interconnected by at least one steel reinforcing rod, and preferably two, that extend the length and width of the female slab in both the longitudinal (X) direction and transverse (Y) direction. When the male and female slabs are assembled, with the male connectors properly positioned within their corresponding female connector sockets, the female sockets are then filled with high strength grout or other solidifying material to finish off the connection. When so assembled, the longitudinal and transverse reinforcing rods in conjunction with the male and female connectors provide continuous reinforcement between the male and female slabs in two directions, both longitudinally and transversely.

Where a female slab or a male slab is to be positioned at an open edge of the assembled slab system, i.e., with no corresponding male or female slab positioned adjacent the open edge, the projecting rod ends or female connector sockets, as the case may be, are preferably omitted along the open edge so as to provide a finished edge around the assembled slab system.

In a preferred embodiment of the present invention, the head or similar fixture fitted to the distal end of the metal rods projecting from the sides of the male slab is in the form of a large threaded nut which is threadedly engaged upon threads formed at the distal end of the metal rods. This threaded engagement between the nuts and distal ends allows for minor adjustment of the male connectors in the longitudinal direction so as to compensate for minor variations in the male connectors and the female sockets.

The female connector sockets or socket fixtures preferably have a "key hole" shape in both the horizontal (X and Y dimensions) and vertically along the side of the slab (the Z direction). The female sockets are preferably made of steel or other rigid material and cast into the desired shape. Starting from the female slab side edge, the female socket has an elongated slot at its top which opens up into a receiving cylinder or enlarged chamber for receiving the head or other fixture at the distal end of the male connector. In the vertical direction, the female socket has a similar slot opening to a wider section or cylindrical channel at the bottom. The enlarged chamber and channel are sized to provide dimensional tolerance to the male connector when positioned in the female connector socket to adjust for variations in the male connectors and the female sockets during manufacture of the precast male and female slabs.

The male and female slabs of the present invention can be manufactured utilizing forms of the type typically used to manufacture prefabricated concrete slabs. The reinforcing metal rods for the male slabs are positioned longitudinally and transversely (the X and Y directions) in the forms with the threaded ends and nuts thereon protruding at least the required distance beyond the designated side walls of the slab to be formed. The concrete or other cementitious material can then be poured into the form and the slab cast. The rod projections can be cut back to the prescribed length, if necessary. The nuts can be threaded on the rod ends before or after casting as desired.

The female slabs are formed in the same manner. Reinforcing rebar rods interconnecting oppositely facing sockets (or without sockets along one or more open side edges) are spaced longitudinally and transversely with the outer and upper surfaces of the female connector sockets positioned to be flush with the top surface and side edge of the female slab in the form. The concrete or other cementitious material is added to precast the slab with the female sockets positioned along the upper side edges of the slab. If desired, the male and female slabs can have a concave indentation midway in the sides around the periphery of the slabs.

According to a second and the preferred embodiment, the present invention includes a plurality of prefabricated concrete slabs that can be laid down in a linear sequence to form a multiple-slab unit for repairing improved road surfaces. Unlike the first embodiment, the slabs are not formed as male and female slabs but instead each slab incorporates one or both of these connection components. This can result in enhanced ease of installation and more efficient manufacturing.

In a slab having female socket fixtures along at least one side edge, each of these fixtures is coupled to a corresponding reinforcing element in that slab which extends in longitudinal alignment with that fixture. This coupling may be effected using various connection methods. According to one embodiment, the fixture includes a screw socket that receives a correspondingly threaded end of the respective reinforcing element. In another embodiment, the respective reinforcing element is welded to its corresponding fixture as through a support plate or the like. Other attaching methods may also be used.

In a slab having female socket fixtures and coupled reinforcing elements that is to be positioned so as to abut against another slab on the side distal from the female socket fixtures, the coupled reinforcing elements project beyond the slab edge on the distal side to form spaced male connectors. These male connectors are, in turn, coupled with female socket fixtures along a side edge of the abutting slab. Thus, the coupling of female socket fixtures and reinforcing elements within a single slab enables each slab to provide male and/or female connection capability.

In slabs that are positioned internally, i.e., that have abutting slabs on all four sides, two adjacent sides are provided with female socket fixtures while the reinforcing elements coupled to these fixtures form spaced male connectors on the respective opposing adjacent sides.

In those positions in which a given slab is to form an open edge of the assembled slab system, i.e., with no abutting slab positioned adjacent the open edge, the length of the reinforcing elements extending toward the open edge is reduced to eliminate the projecting ends and thereby provide a finished edge around the assembled slab system.

Slabs in corner positions of a matrix-type assembled slab system, so as to have two adjacent open sides, can be constructed to have two male sides and two finished edges, two female sides and two finished edges, or one male side, one female side, and two finished edges, depending upon the particular one of the four corners being represented.

Slabs in end positions of a row or column-type assembled slab system, so as to have three adjoining open sides, can be constructed to have one male side and three finished edges, or one female side and three finished edges. One or more slabs placed between these end position slabs would correspondingly each have one female side, one male side and two finished edges.

Accordingly, it is an object of the present invention to provide a precast concrete slab connector system that allows two adjacent preformed concrete slabs to be connected together quickly and easily.

It is another object of the present invention to provide a concrete slab connector system that allows two connected precast concrete slabs to develop full tension reinforcement in two dimensions.

It is a further object of the present invention to provide a pre-fabricated concrete slab system wherein the precast concrete slabs have male and female type connectors and wherein the slabs interconnect with each other in a checkerboard fashion.

It is yet another object of the present invention to provide a precast concrete slab system having male and female slabs wherein male type pre-fabricated concrete slabs have a plurality of reinforcing rods which extend through the slabs, in both the X and Y directions, and protrude beyond the lateral edges on one to four sides of the slab. The rod projections are fitted at their distal ends with a head or similar fixture which is wider than the diameter or width of the rod or cable to form male connectors.

It is a still further object of the present invention to provide a precast concrete slab system having male and female slabs wherein female type pre-fabricated concrete slabs have a plurality of connector sockets which are designed to allow the projecting male connectors to drop into the female connector sockets on one to four sides when a male slab is lowered and fitted adjacent one or more female slabs. The socket fixtures in the female slabs are connected to steel reinforcing rods that extend the length and width of the slab in the longitudinal and transverse directions to provide superior strength and develop full tension reinforcement between the male and female slabs in two dimensions.

Still another object of the present invention is to provide a method for assembling a precast concrete slab system wherein (1) at least one rectangular female concrete slabs, having a plurality of female socket fixtures spaced along one or more side edges interconnected with reinforcing elements extending longitudinally and transversely through the female slab, is positioned on a roadbed, (2) at least one rectangular male concrete slab, having a plurality of reinforcing elements extending longitudinally and transversely through the slab and projecting beyond one or more side edges to form spaced male connectors, is positioned adjacent a side edge of a female slab having the spaced female socket fixtures therealong such that the spaced male connectors are received in respective spaced female socket fixtures, and (3) each of the female socket fixtures having a respective male connector received therein is filled with a binder material which, when solidified, fixes the male connectors in the female socket fixtures and provides continuous reinforcement between the male slab reinforcing elements and the female slab reinforcing elements.

It is another object of the present invention to provide a precast concrete slab system in which each slab can have male and/or female connectors, with each female connector formed along at least a first edge being coupled with a reinforcing member that, if made with sufficient length, projects beyond an opposing edge to form a male connector.

It is an additional object of the present invention to provide a precast concrete slab system in which, within a given slab, female connectors are coupled with respective reinforcing members that are aligned therewith.

It is yet a further object of the present invention to provide a precast concrete slab system in which, within a given slab, each female connector is provided with a screw socket to receive a correspondingly threaded end of a respectively aligned reinforcing member.

Yet another object of the present invention to provide a precast concrete slab system in which, within a given slab, each female connector is provided with a support plate or other element to facilitate welding of the aligned reinforcing member to its respective female connector.

Still another object of the present invention is to provide a method for assembling a precast concrete slab system wherein (1) at least a first rectangular concrete slab having reinforcement elements extending therethrough and having a plurality of female socket fixtures spaced along at least a first side edge, is positioned on a roadbed, (2) at least one adjoining rectangular concrete slab, having a plurality of reinforcing elements extending to project beyond at least the adjoining side edge to form spaced male connectors, is positioned adjacent the first side edge of the first slab such that the spaced male connectors are received in respective spaced female socket fixtures, and (3) each of the female socket fixtures having a respective male connector received therein is filled with a binder material which, when solidified, fixes the male connectors in the female socket fixtures and provides continuous reinforcement between the reinforcing elements of the two slabs.

Yet another object of this invention to be specifically enumerated herein is to provide a precast concrete slab system in accordance with the preceding objects which will conform to conventional forms of manufacture, be of simple construction and easy to use so as to provide a precast concrete slab system that will be economically feasible, strong and long lasting and relatively trouble free in installation and use.

These together with other objects and advantages of this invention which will become subsequently apparent reside in the details of constructions and operations as more fully hereinafter described and claimed, reference being had to the accompanying drawings forming a part thereof, wherein like numerals refer to like parts throughout.

BRIEF DESCRIPTION OF THE DRAWINGS

FIG. 8 shows an exploded partial perspective side view of the female socket fixture, with a preferred male connector positioned thereabove.

DETAILED DESCRIPTION OF THE PREFERRED EMBODIMENTS

Figure 1:
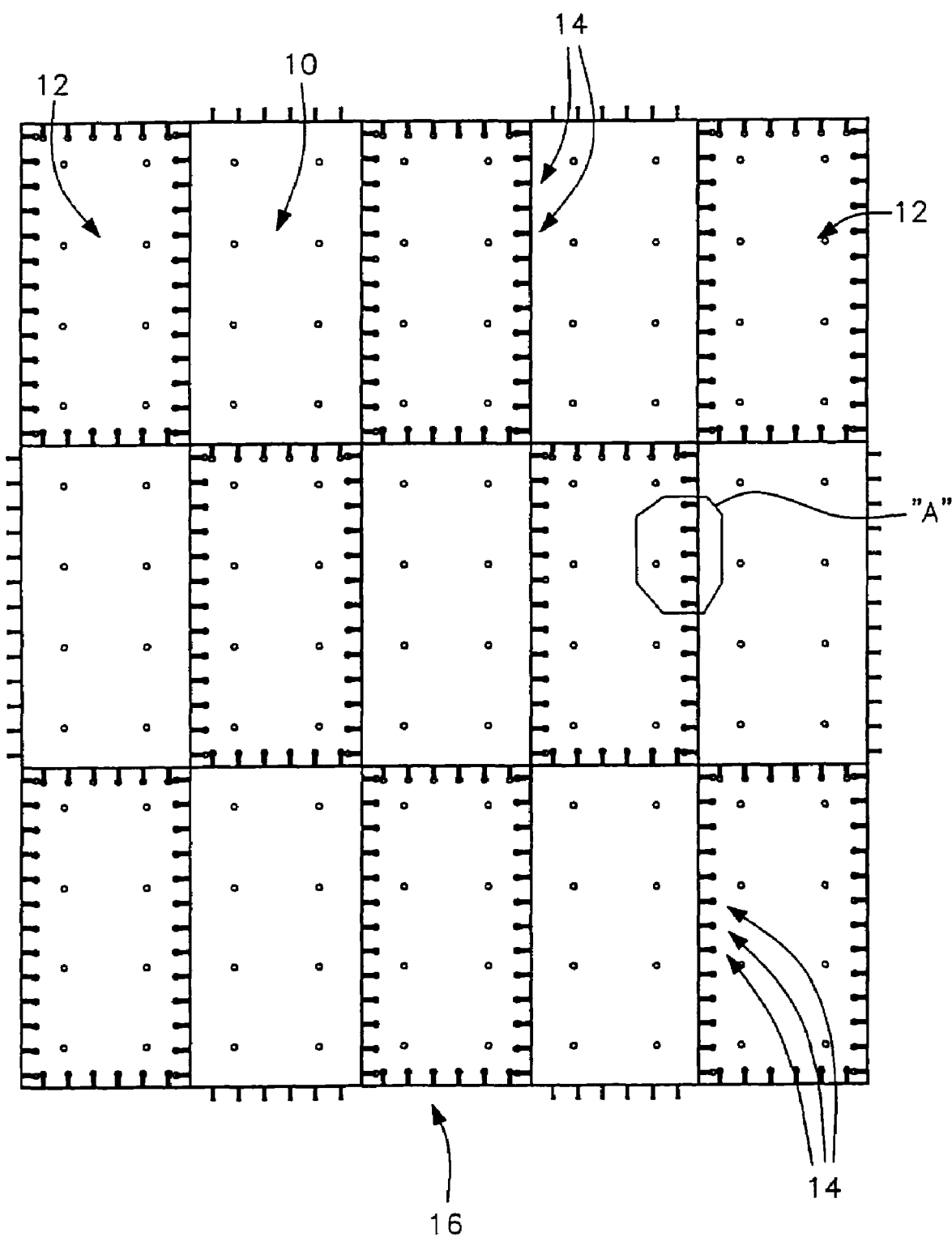
FIG. 1 shows a top plan view of an assembled section of a precast concrete slab system in accordance with a first embodiment of the present invention.

Although preferred embodiments of the present invention are explained in detail, it is to be understood that other embodiments are possible. Accordingly, it is not intended that the invention is to be limited in its scope to the details of constructions and arrangement of components set forth in the following description or illustrated in the drawings. The invention is capable of other embodiments and of being practiced or carried out in various ways. Also, in describing the preferred embodiments, specific terminology will be resorted to for the sake of clarity. It is to be understood that each specific term includes all technical equivalents which operate in a similar manner to accomplish a similar purpose. Further, although the drawings are intended to illustrate the present invention, the drawings are not necessarily drawn to scale.

Referring to the drawings, FIG. 1 shows a plan view of rectangular male slabs, generally designated by reference numeral 10, and similarly sized rectangular female slabs, generally designated by reference numeral 12, in accordance with a first embodiment of the present invention. Square slabs are contemplated in the broader term "rectangular." The male slabs 10 and female slabs 12 are interconnected to each other in a checkerboard fashion by connectors, generally designated by reference numeral 14, to form a roadway section or the like, generally designated by reference numeral 16.

The male slab 10 has a plurality of reinforcing rods 18 which extend horizontally through the slab in both the X (longitudinal) and Y (transverse) directions generally perpendicularly to each other. The rods 18 have projections 20 which extend outwardly a short distance, preferably about 5 inches to about 10 inches, from all four sides 22 of the male slab 10. Fitted to the distal end of each projection 20 is a lug or head 24 which is larger in cross-section than the diameter of the rods 18 (and projections 20) to form male connectors generally designated by reference numeral 26. In a preferred embodiment, the ends of projections 20 are threaded as at 28 (see FIG. 8) and the head or lug 24 is a correspondingly threaded nut 30 which can be adjusted lengthwise to accommodate tolerance variations, as described hereinafter.

The male slabs 10 are typically constructed by pouring a paving material such as concrete or other similarly used material into a rectangular form (not shown). The form has the reinforcing rods 18 properly positioned longitudinally and transversely therein and with the male connectors 26 extending beyond the form side edges.

Figure 6:
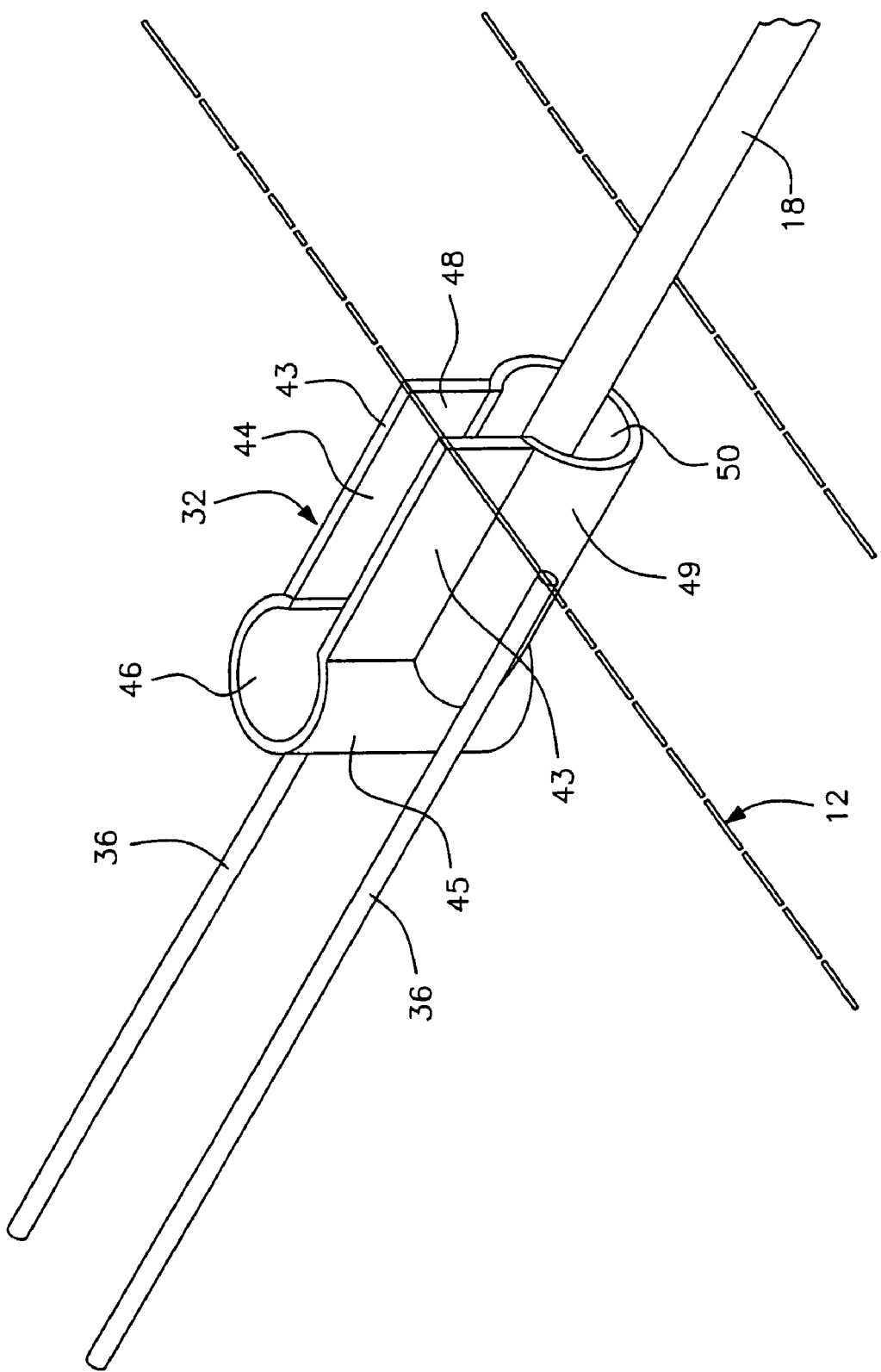
FIG. 6 shows a cut-away view of a female socket fixture in accordance with the present invention with the steel rebar for reinforcing the precast female slab and the end of the male rod extending into the female socket fixture.
Figure 7:
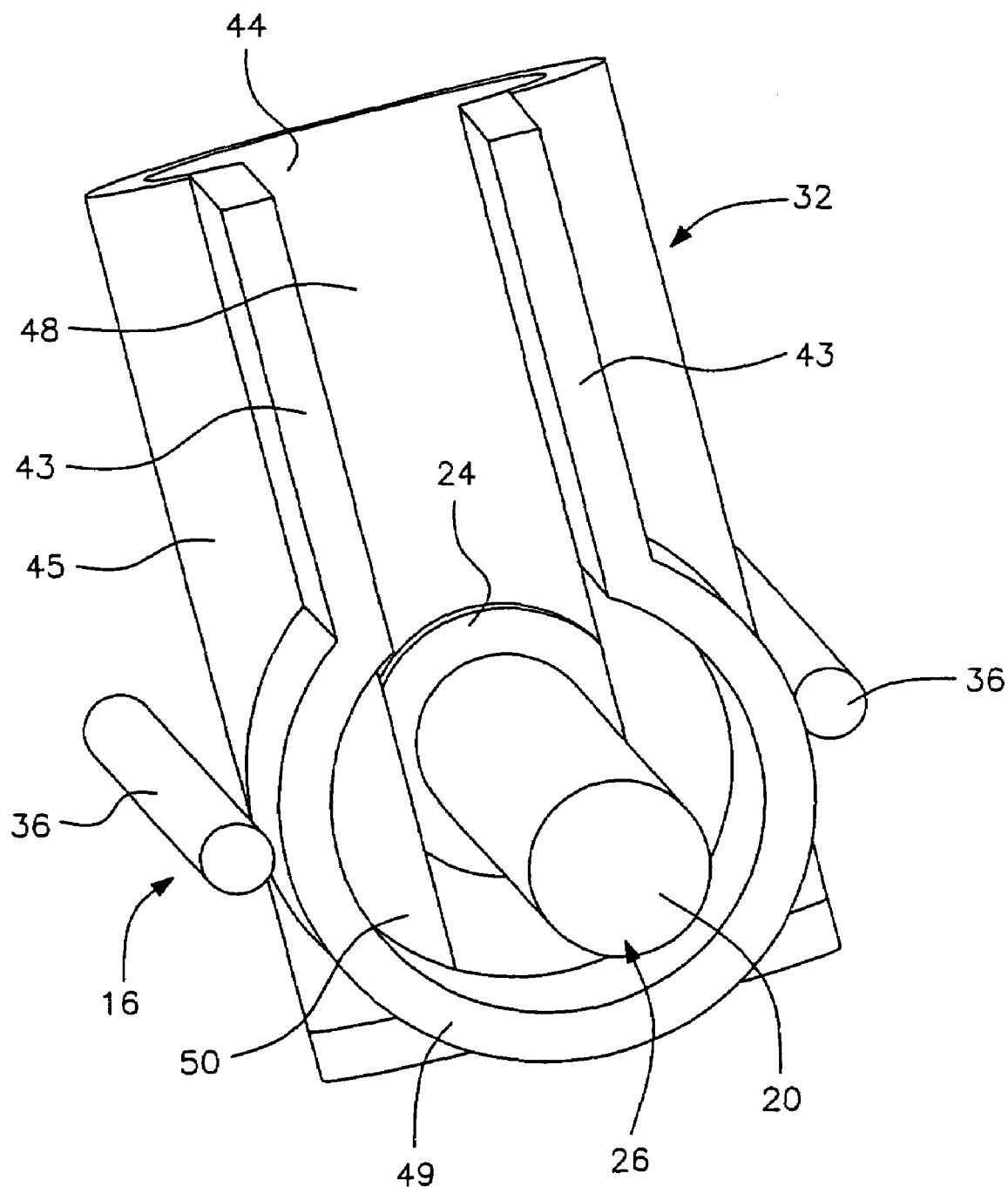
FIG. 7 shows a perspective front view of the female socket fixture and components shown in FIG. 6, as viewed looking into the socket from the side of the slab.

The female slab 12 is fitted with a plurality of female connector sockets or socket fixtures, generally designated by reference numeral 32, along each female slab side edge 34, both longitudinally and transversely, each of which is positioned to receive a corresponding male connector 26. Attached to each female socket 32 is one or more reinforcing rebar rods 36 which extend through the female slabs 12 in both the X and Y directions and attach to a corresponding female socket fixture 32 on the opposite sides of the slab 12. In a preferred embodiment a pair of rebars 36 are welded or otherwise attached along the side of each socket fixture 32, as shown in FIGS. 6 and 7. The rods 18 of the male slabs 10 and the rebar 36 attached to the female sockets 32 are sized and spaced longitudinally and transversely, and the number of slab connectors 14 including the interconnecting male connectors 26 and female sockets 32 are selected, depending upon the design and strength characteristics for the assembled precast slab system. While steel rods are preferred for rods 18 of the male slabs 10 and rebar 36 of the female slabs 12, as typically used in reinforced precast concrete slabs, other elongated reinforcing elements could be used, perhaps with modification, such as stiff metal cables, metal straps or other elongated components typically used to reinforce concrete and the like.

The female slabs 12 are also constructed by pouring concrete or the like into a rectangular form which positions the female sockets 32 along the edges and the rebar 36 longitudinal and transversely through the slab 12. When used in the field, the female slab or slabs 12 are put in position first and then the male slabs 10 are dropped in adjacently in the checkerboard pattern as seen in FIG. 1.

Figure 2:
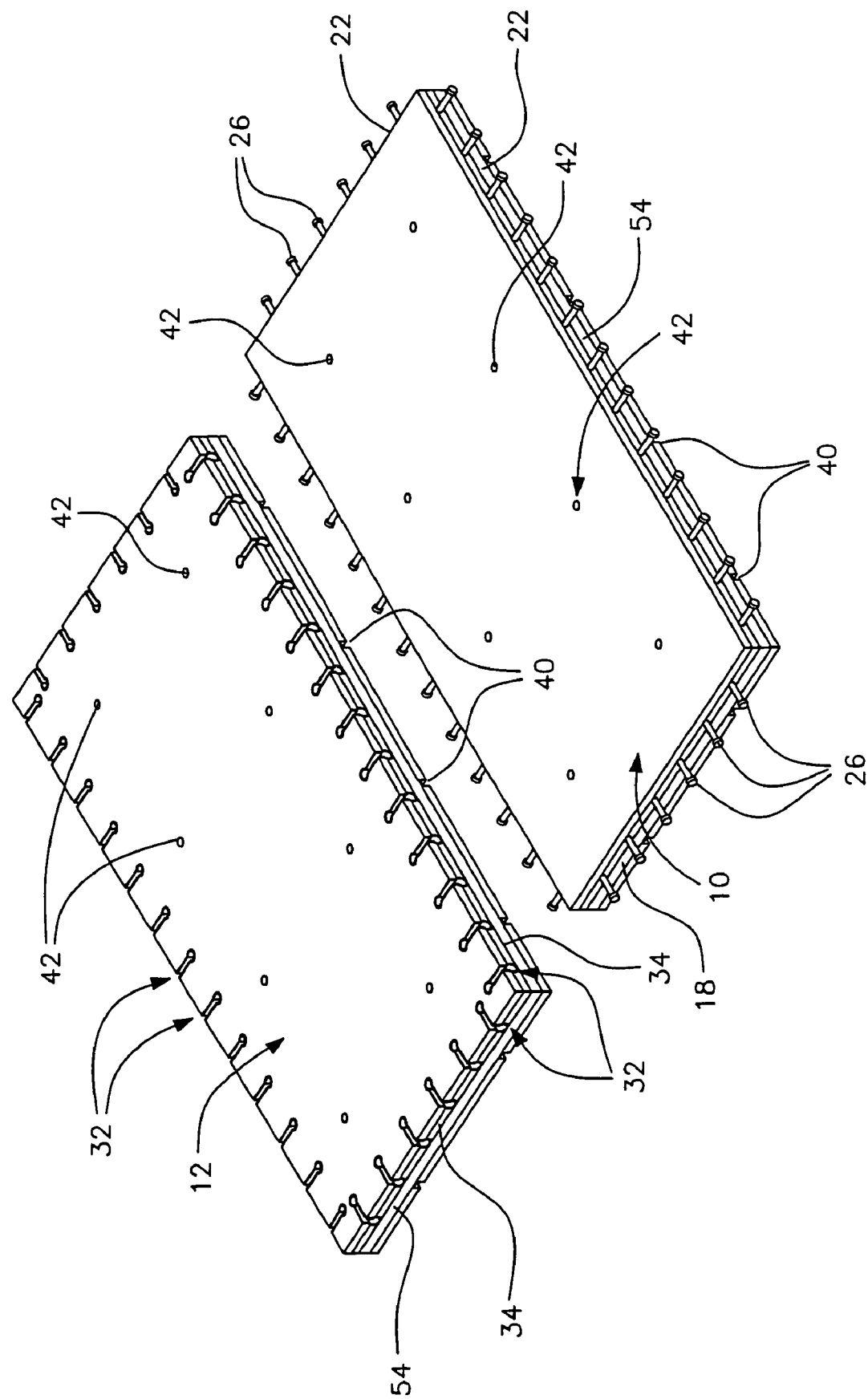
FIG. 2 shows a perspective top angle view of one male and one female slab in accordance with the first embodiment of the present invention lying side-by-side, but spaced from each other.

FIG. 2 illustrates a male slab 10 with a plurality of male connectors 26 protruding from all four lateral sides 22 which are aligned with the plurality of female sockets 32 along all four lateral sides 34 of the female slab 12. When these slabs are laid on a subgrade for assembly, the bottom surface of the slabs will not be a perfect fit to the contour of the subgrade. In order to eliminate the areas formed by these irregularities in the subgrade or slab, the bottoms of the slabs 10 and 12 are provided with a series of grooves or channels 40 which extend the length of the slabs in both the longitudinal and transverse directions and intersect each other at various points to form a grid pattern (See FIG. 3). A grout hole 42 is formed on the top side of both the male slabs 10 and the female slabs 12 where the longitudinal and transverse channels 40 intersect on the bottom of the slabs for inserting grout or concrete or similar binder into the channels on the bottom side of the slabs. The grout or similar binder is pumped into the holes 42 in order to fill the grooves or channels 40 and the void areas between the underneath sides of the slabs 10 and 12 and the subgrade material.

Figure 4:
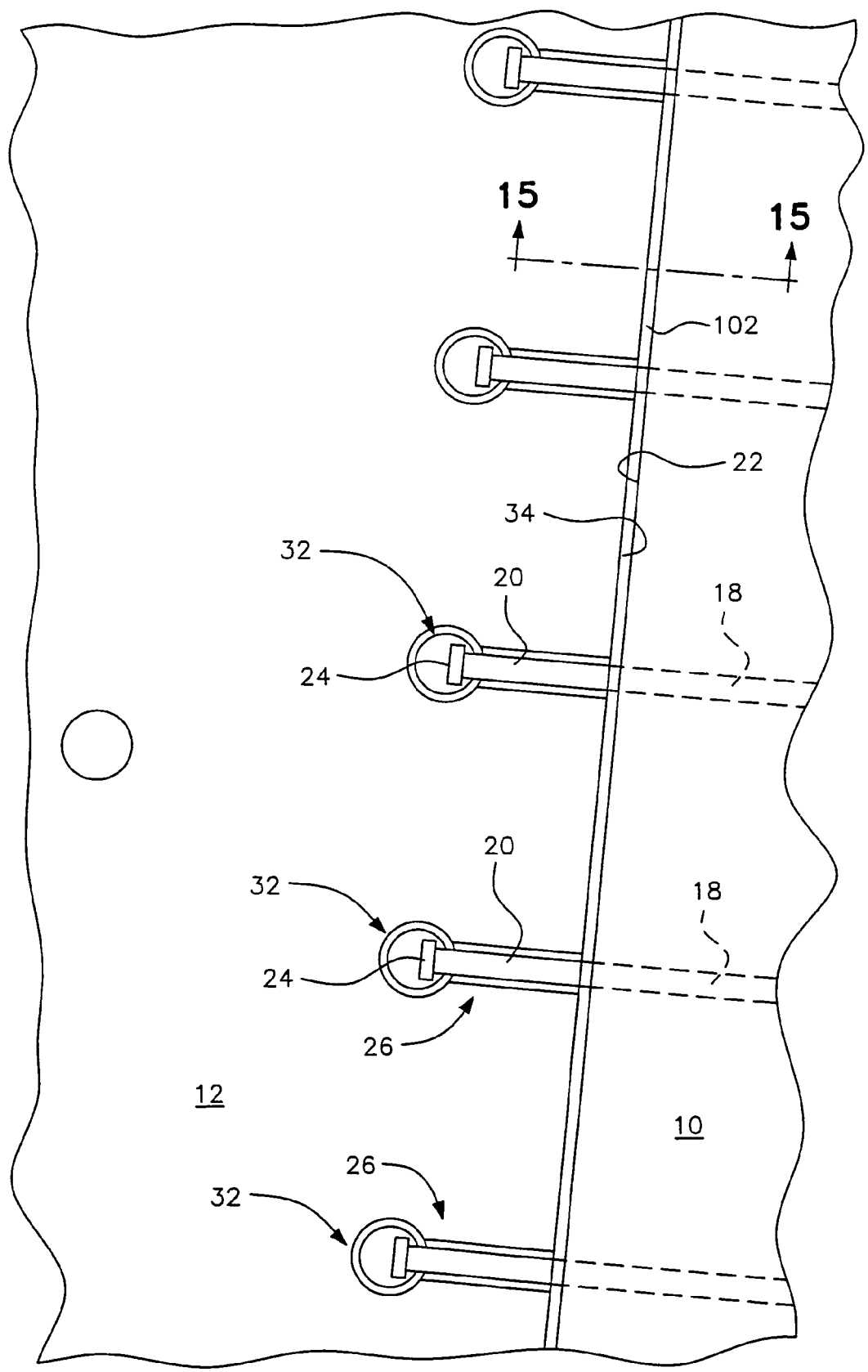
FIG. 4 shows a closer view of the attachment or connector system of the first embodiment of the present invention between lateral edges of the male and female slabs when placed adjacent to each other in use.

FIG. 4 is a closer view of Detail "A" from FIG. 1. The male connectors 26 of the male slab 10 are shown aligned and fitted into place into the female sockets 32 of the adjacent female slab 12. In the embodiment depicted, the male connectors 26 include projections 20 with widened heads, or lugs 24. After the male slab 10 is dropped in place, the connectors 26 are secured within the female sockets 32 by filing the sockets with high strength concrete mortar or similar material to secure the connector 26 permanently and rigidly in place.

Figure 5:
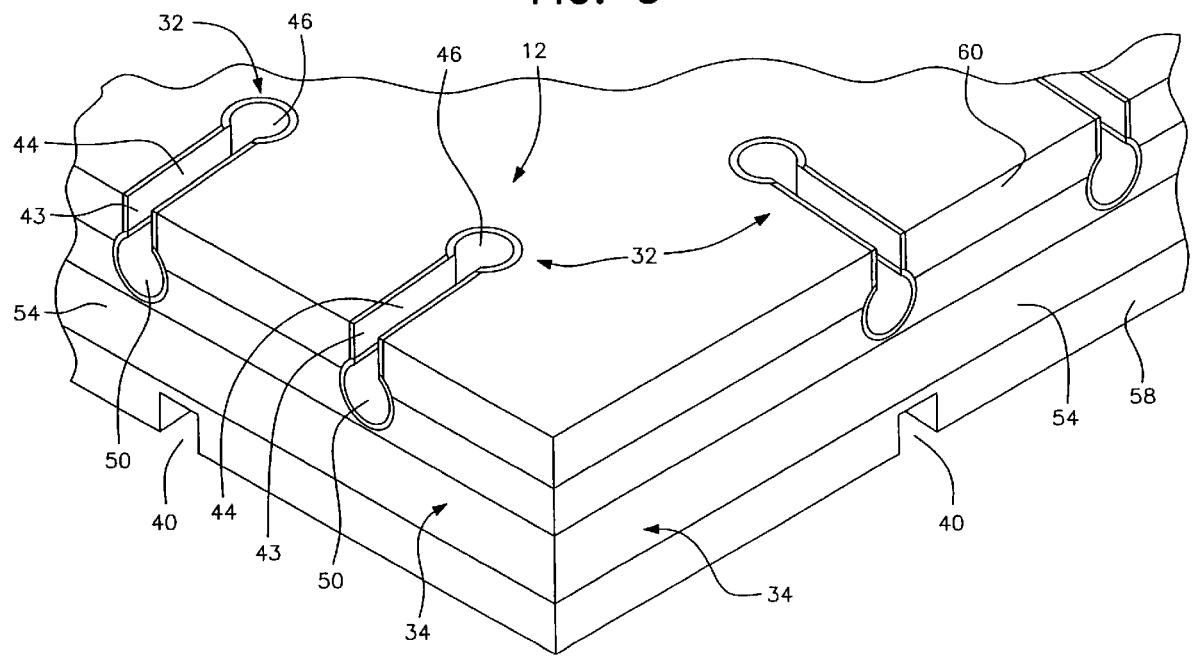
FIG. 5 shows a perspective detail view of the corner of a female slab in accordance with the present invention showing how the female connector sockets are placed along the edges of the slab and where the grooves on the slab underside meet the edges of the slab.

In FIG. 5, a corner detail view shows how the female sockets 32 are shaped and fit into the lateral side edges 34 of the female slab 12. The female sockets 32 are preferably formed or molded as one piece from a high strength material, such as steel or other durable metal or other suitable material, and placed into their proper positions in the female slab 12 by the form during the female slab's formation. The female sockets 32, in a preferred embodiment, have a three-dimensional "keyhole" shape. When viewed from the top, the female socket 32 has generally vertical side walls 43 which form a vertical slot 44 along its longitudinal axis, as one moves from the edge 34 of the slab toward the middle. The rear of the side walls 43 open into an enlarged cylindrical end wall 45 which defines a cylindrical chamber 46.

Figure 16:
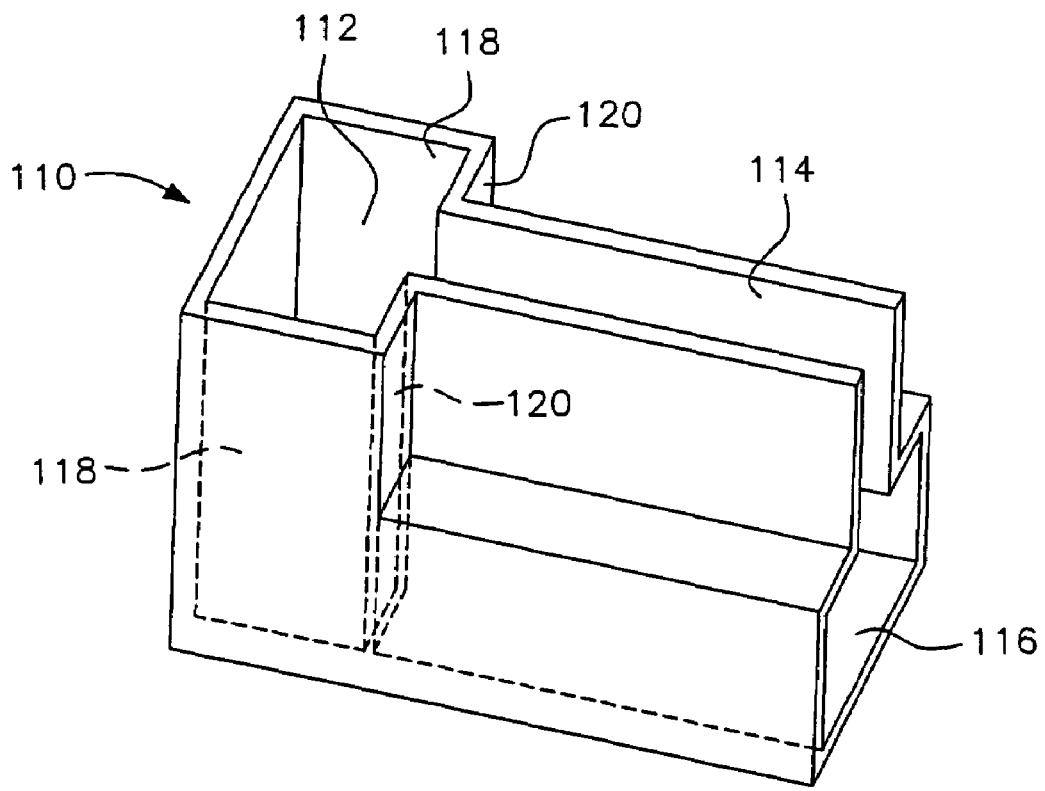
FIG. 16 is a perspective side view of an alternate female socket fixture.

In an alternate embodiment for the female socket 32, as shown in FIG. 16, the female socket is generally designated by reference numeral 110. The socket 110 has a rectangular shape such as a "T" shape where the chamber 112 at the head of the "T" is wider than the slot 114 so that the widened head or lug 24 of the male connector 26 can be lowered vertically into the "T" for receipt into the enlarged channel 116. The head 24 is then secured from being moved laterally in either direction by walls 118 or pulled horizontally out of the socket 110 by wall portions 120 on both sides of slot 114. Other shaped female sockets which allow the male connector 26 to be lowered vertically into the socket and which physically retain the male connector in the socket are also contemplated in accordance with this invention.

FIG. 6 shows a female socket 32 connectively pre-attached to the pair of steel reinforcing rebar or rods 36 on either side of the female socket and reinforcing rod 18 from the adjacent male slab 10 with male connector 26 in place in the socket 32. The steel reinforcing rods or rebars 36 are pre-welded or otherwise rigidly secured to the female socket 32 on both lateral sides before assembly into the molds to cast the concrete for the female slab 12. Socket fixtures 32 positioned along one shorter transverse side edge are pre-welded or otherwise securely connected to reinforcing rods 36 running in the longer longitudinal direction which then terminate at a socket fixture 32 correspondingly positioned on the opposite transverse side edge. Similarly, the socket fixtures 32 positioned along the longer longitudinal side edge are pre-welded or otherwise securely connected to reinforcing rods 36 running in the shorter transverse direction which then terminate at a corresponding socket fixture 32 on the opposite longitudinal side edge.

When the female socket 32 is viewed from the front, as in FIG. 7, the socket also preferably has a vertical "keyhole" shape. The vertical opening 48 at the front of side walls 43 defining slot 44 is straight as one moves from the top of the slab 12 to the bottom and opens into a cylindrical bottom 49 defining a circular channel or opening 50. This shape allows the male connectors 26 to be dropped in from the top side of the female slab 12 and limits the lateral or horizontal movement of the male connectors once in place in the female socket 32. The enlarged channel or opening 50 at the bottom of slot 44 provides tolerance in the event of minor irregularities in the positioning of the male connectors 26 along the side edges 22 of the male slab 10 and their corresponding female sockets 32 along the adjacent side edge 34 of the female slab 12.

Figure 3:
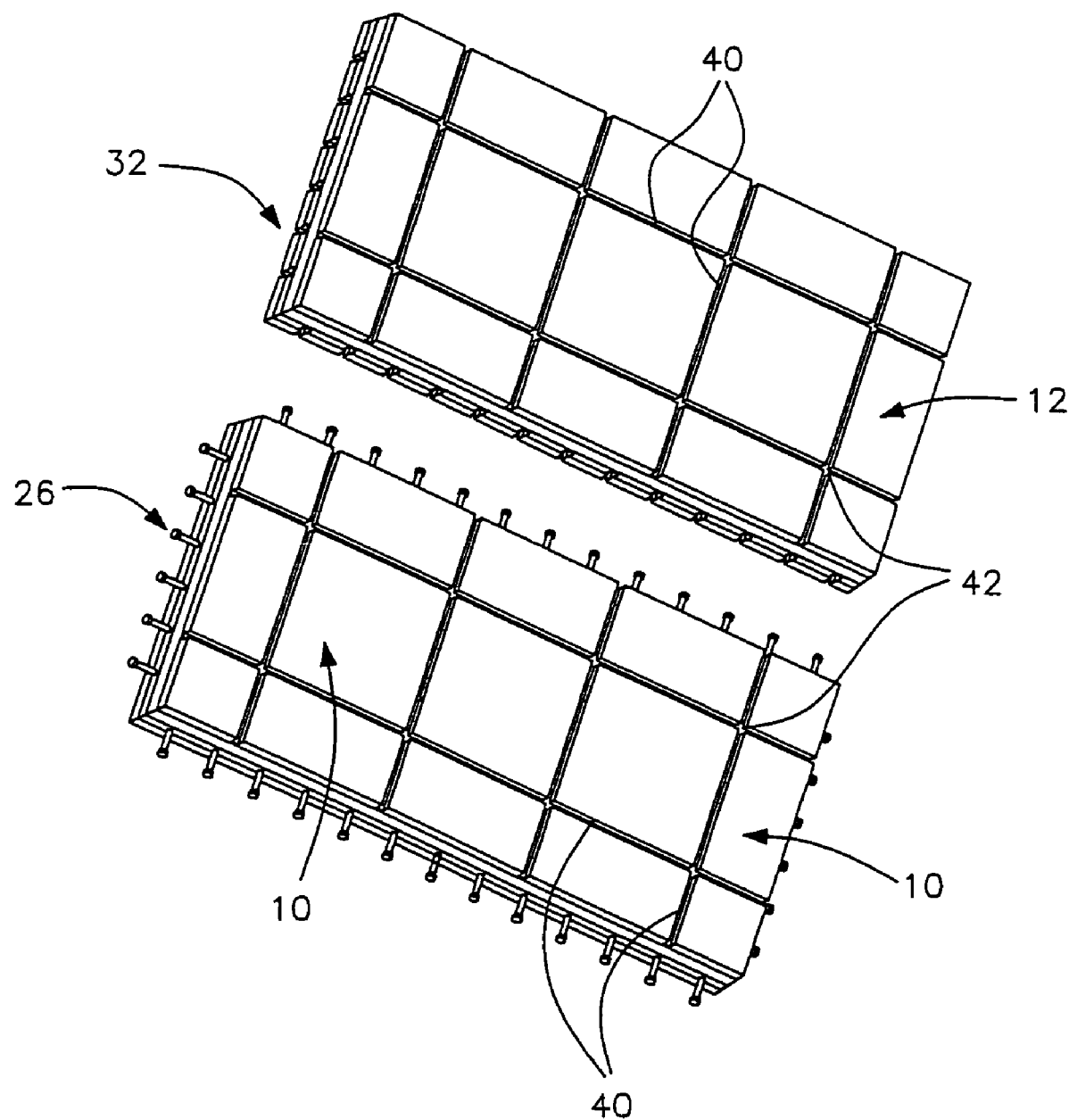
FIG. 3 shows a bottom view of one male and one female slab in accordance with the present invention similar to FIG. 2.

As stated above, both the male slabs 10 and female slabs 12 preferably include a plurality of channels 40, six as shown, two of which run longitudinally in the X direction of the slabs, and four of which run transversely in the Y direction. The channels 40 formed along the bottom surfaces of the slabs facilitate the even distribution of a bedding material, such as bedding grout or concrete, a polymer foam material, or other similar material, to the underside of the slabs. As shown in FIG. 3, the channels 40 include a grout hole 42 at each intersection of the longitudinal and transverse channels 40, thereby providing access to the channels 40 from the top surface of the slabs. The grout holes 42 permit injection of the bedding material beneath the bottom surface of the slabs from the top surface after the slabs have been installed in place.

Figure 15:
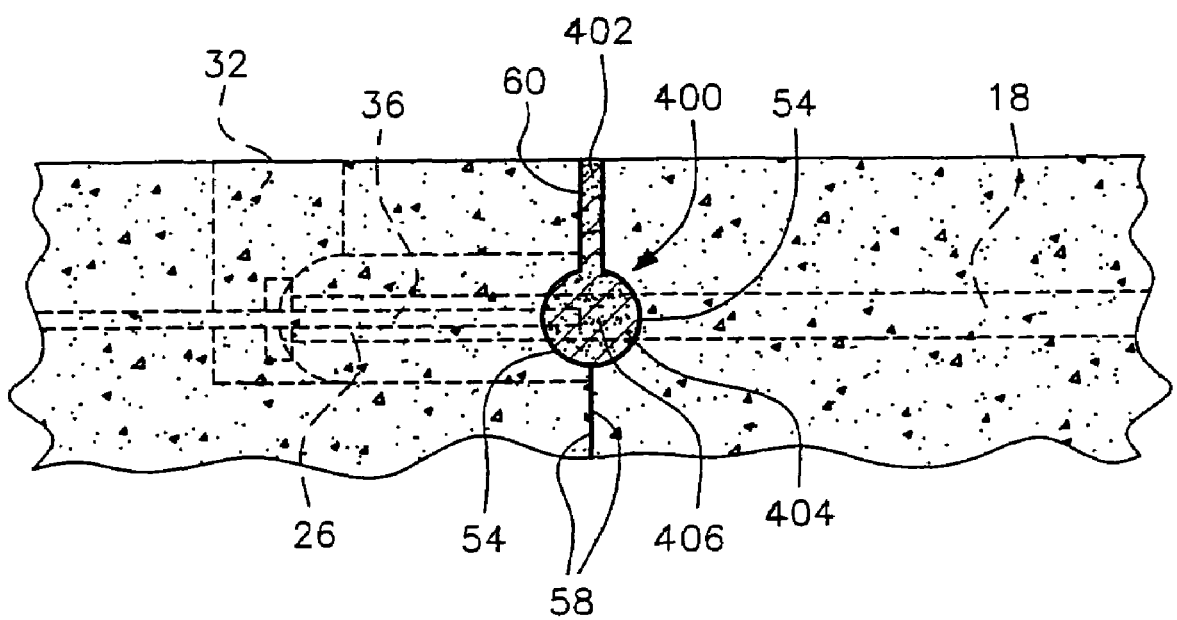
FIG. 15 shows a cross-sectional view taken along line 15-15 of FIG. 4, illustrating the keyway between adjacent male and female slabs which is filled with grout filler material in the assembled slab system.

As illustrated in FIG. 5, the channels 40 are preferably in the shape of rectangular voids. In alternative embodiments, the channels 40 may take other shapes, such as half-round voids, trapezoidal voids. Further, the side walls 22 of male slabs 10 and side walls 34 of female slabs 12 are shaped to form a keyway, generally designated by reference numeral 400, between adjacent side walls 22 and 34 (see FIG. 15). The keyway 400 is slotted at the top forming slot opening 402 which opens into central groove 404. The groove 404 is formed by facing horizontal concave cavities 54 approximately midway in the side walls (see also FIGS. 2 and 5). These cavities 54 leave upper and lower ledges 60 and 58, such as shown in FIGS. 5 and 15. The upper ledge 60 projects outwardly a lesser distance than lower ledge 58 so as to leave the space for slot opening 402 when ledges 58 of adjacent slabs are abutted. When the male slabs 10 and female slabs 12 are positioned adjacent each other in the concrete slab system of the present invention, the keyways 400 can then be filled with a binding material 406, such as early high-strength cement grout. When hardened, the binding material 406 in the keyways 400 serve to prevent adjacent male and female slabs from moving vertically with respect to each other.

Figure 8A:
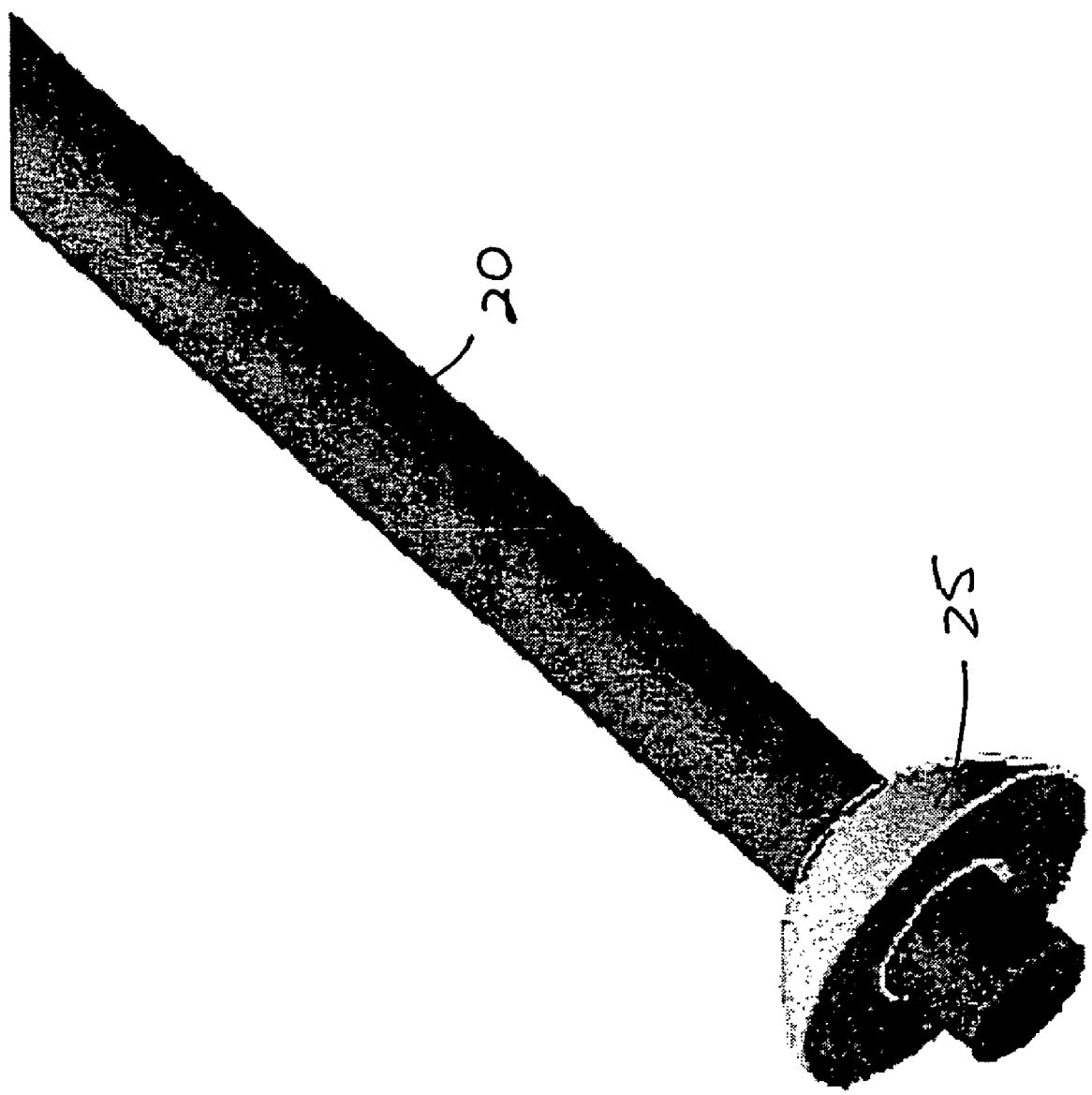
FIG. 8A is a perspective view of an alternative embodiment of the male connector in accordance with the present invention.
Figure 9:
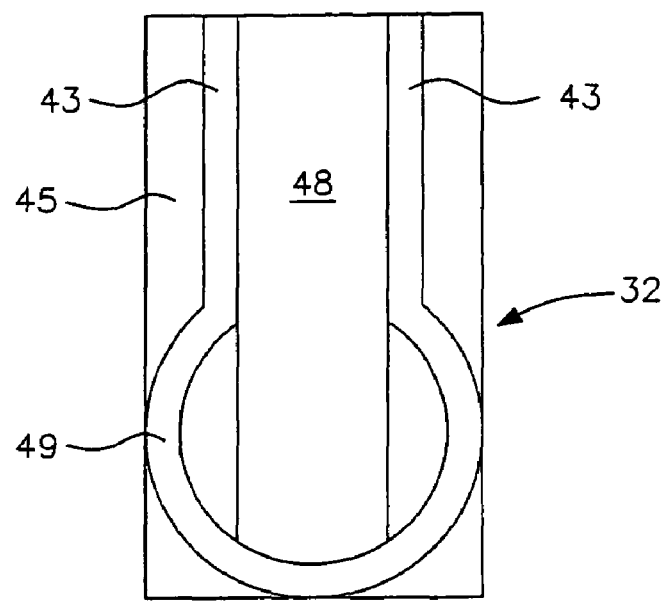
FIG. 9 shows a front view of the female socket fixture of FIGS. 6-8 by itself.
Figure 10:
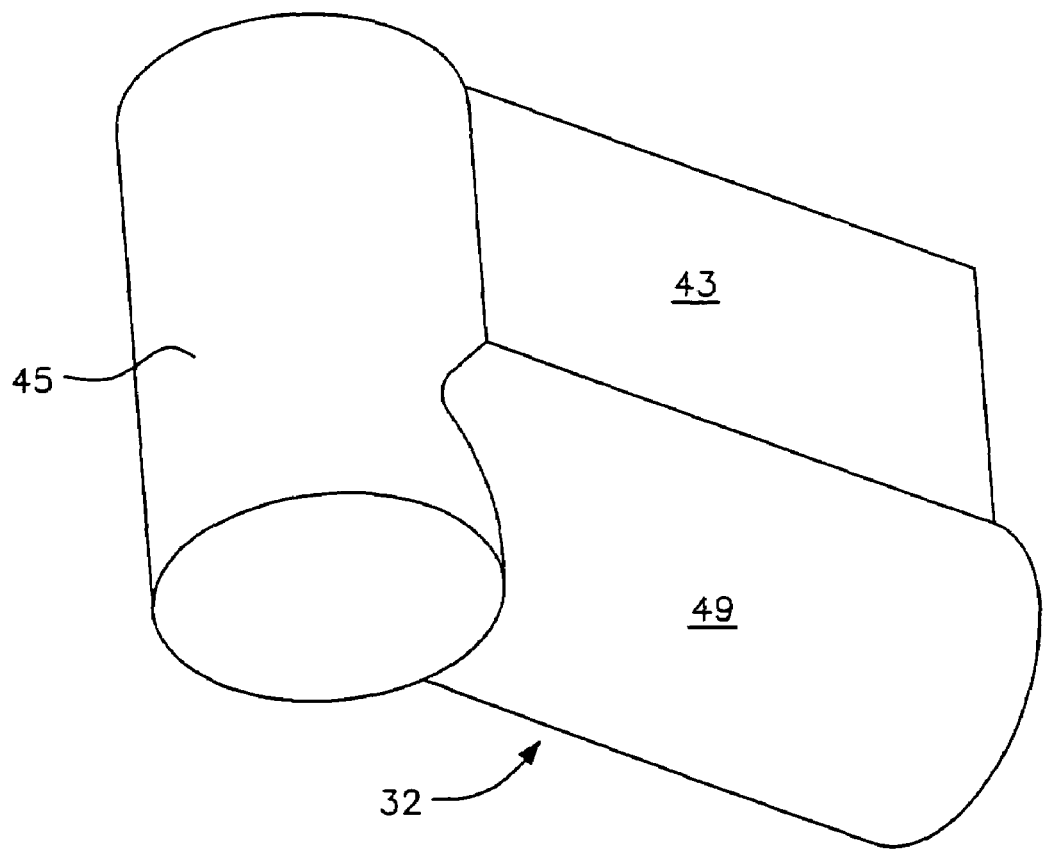
FIG. 10 shows a perspective bottom angle view of the female socket fixture of FIGS. 6-8 by itself.

The rods 18 of the male slab 10 are preferably made of steel reinforcing rods or other reinforcing material typically used to reinforce concrete and the like. In one embodiment, the ends or projections 20 are cut to the correct length and the ends hammered down or forged with the aid of heat to broaden or otherwise flatten the distal end to form the head 24 for the male connectors 26. The rods 18 are then placed in the form when the male slab 10 is created with the connectors 26 extending beyond the form the prescribed distance. As shown in FIG. 8, in a preferred embodiment, the projections 20 have threaded distal ends 28 on which are threaded large nuts 30 to form the enlarged head 24. The nuts 30 can be screwed onto the distal ends of the projections 20 before or after the male slab 10 is formed. With the nuts 30 forming the head 24 and threadedly received on the distal end of the projections 20, the nuts 30 (i.e. head 24) can be adjusted along the longitudinal axis of projections 20 to compensate for any minor misalignment between the nut 30 and its receipt within recess 46 of female socket 32. An alternative embodiment of the male connector is shown in FIG. 8A. In this embodiment, the enlarged head 24 is formed by a washer 25 welded to the projection 20.

Figure 11:
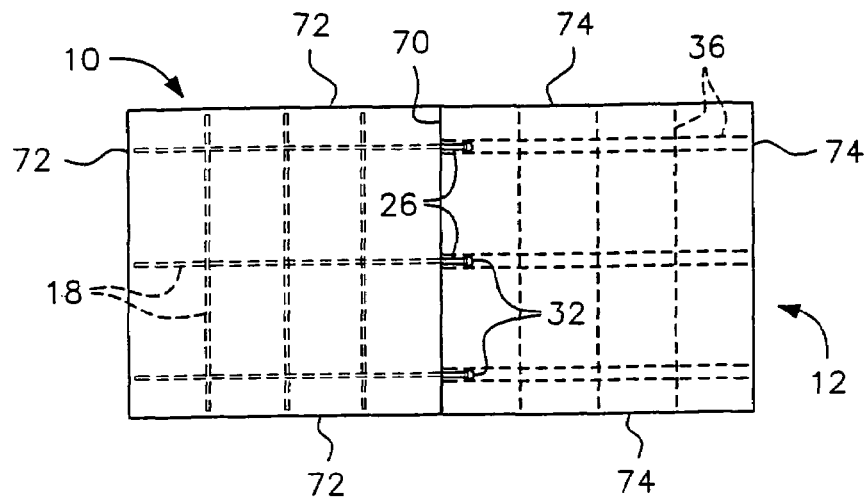
FIG. 11 shows a top plan view of an embodiment of a precast slab system utilizing a single male slab and a single female slab, in accordance with the first embodiment of the present invention.

FIGS. 11-14 show top plan views of various embodiments of precast concrete slab systems in accordance with the present invention, showing the smooth finished open side edges along the outside of each slab system, without projecting rod ends 20 or female connector sockets 32 as the case may be, around the open sides. More specifically, FIG. 11 shows a pair of side-by-side male and female slabs 10 and 12, respectively, interconnected along adjacent edges 70 utilizing the male connectors 26 positioned within the female connector sockets 32, as previously described. The ends of reinforcing rods 18 of the male slab 10 around the three open sides 72 do not include projections 20 and terminate short of the side edges 72, as shown. Similarly, the rebar 36 of female slab 12 around the three open side edges 74 also do not include female connector sockets 32 and terminate short of the open side edges 74. Also, as shown in FIG. 11, the longitudinal rebars 36 (in the X direction), may only be a single rebar strand, rather than the pair of rebar strands 36 in the transverse or Y direction.

Figure 12:
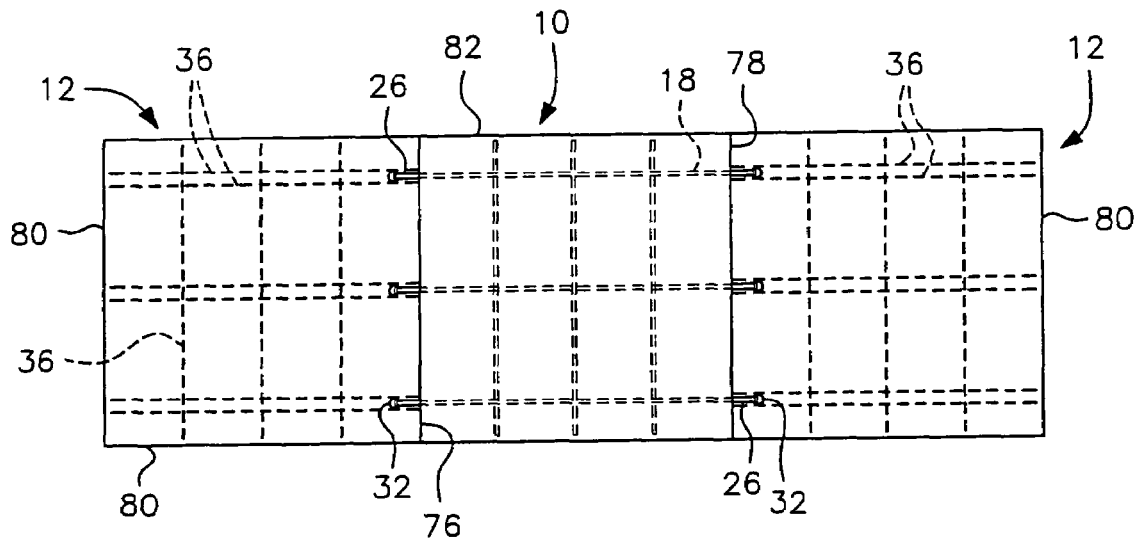
FIG. 12 shows a top plan view of another embodiment of a precast concrete slab system utilizing a single male slab and a pair of female slabs, one on each side of the male slab, in accordance with the first embodiment of the present invention.

FIG. 12 shows a male slab sandwiched in between a pair of female slabs interconnected along side edges 76 and 78 by the male connectors 26 positioned within the female connector sockets 32, as previously described, such that the horizontal rebar 36 of the female slabs 12 and the horizontal rods 18 of the male slab 10 provide continuous reinforcement in the horizontal direction through all three interconnected slabs. The open three sides 80 of the two female slabs 12 and the open two sides 82 of the male slab 10 do not include the female connector sockets 32 or the male connectors 26, respectively, and the embedded rebar 36 and rods 18 terminate short of the open side walls 80 and 82, respectively. Only single rebar strands 36 are needed in the longitudinal (X) direction since sockets 32 are omitted on the open sides.

Figure 13:
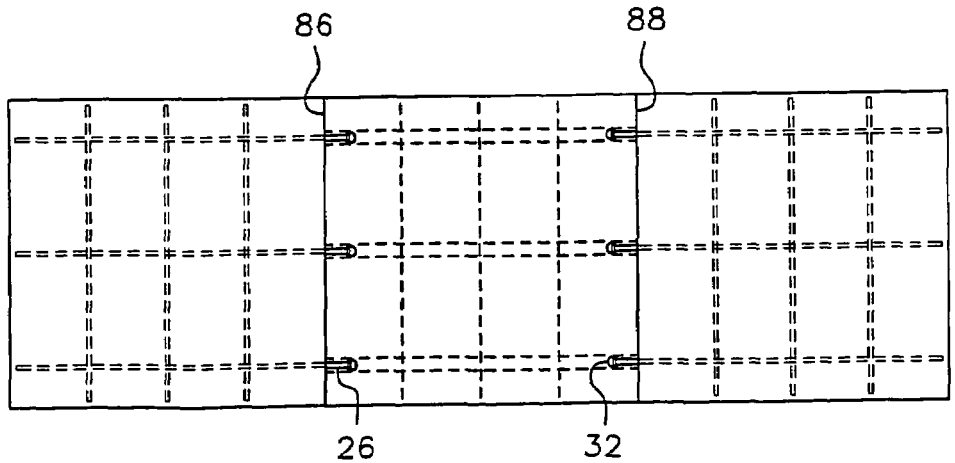
FIG. 13 shows a top plan view of a further embodiment of a precast concrete slab system utilizing a single female slab and a pair of male slabs, one on each side of the female slab, in accordance with the first embodiment of the present invention.

FIG. 13 shows a slab system similar to FIG. 12 except one female slab 12 is sandwiched in between a pair of male slabs 10 which are interconnected along their adjacent side edges 86 and 88 by male connectors 26 positioned within the female connector sockets 32 as previously described.

Figure 14:
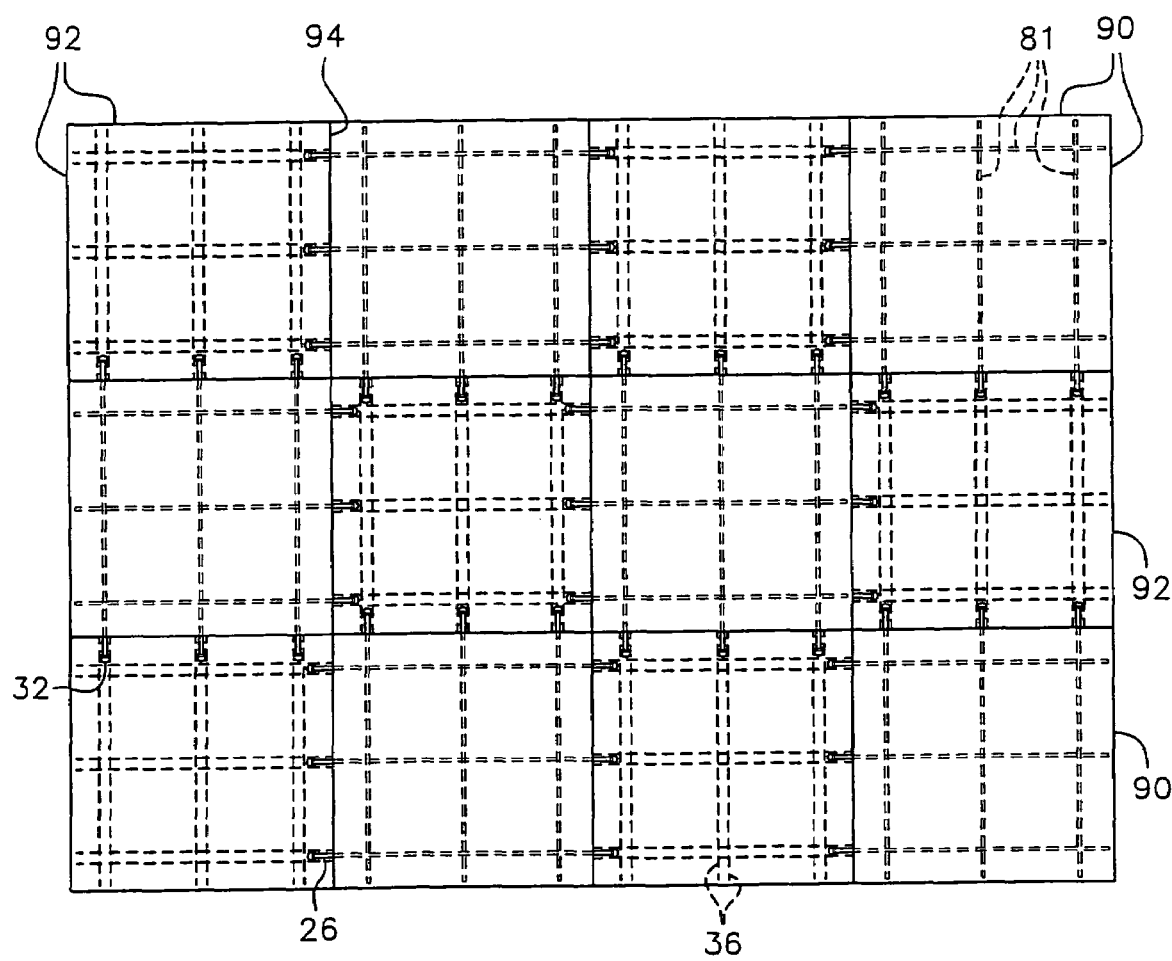
FIG. 14 shows a top plan view of yet another embodiment of a precast concrete slab system having multiple male and female slabs assembled in a checkerboard pattern with the open edges omitting the projecting rod ends or female connector sockets, as the case may be, to provide a finished edge along the assembled slab system, in accordance with the first embodiment of the present invention.

Turning now to FIG. 14, six male slabs 10 and six female slabs 12 are shown assembled into a checkerboard slab system, with open male slab sides 90 and open female slab sides 92, in the same manner as previously described. The side edges of the male slabs 10 adjacent a side edge of a female slab 12 are interconnected along their adjacent side edges, such as side edge 94, by male connectors 26 positioned within female connector sockets 32, as previously described. Around the open side edges 90 and 92, the respective male connectors 26 and female connector sockets 32 are omitted and the rods 18 and rebar 36 embedded in the respective male and female slabs terminate short of the open sides 90 and 92. As described above and shown in FIGS. 11-14, the number of side edges with projecting male connectors 26 and female connector sockets 32 will depend on the number of adjacent side edges requiring reinforcing continuity between corresponding adjacent male and female slabs.

For installation, the male slabs 10 and female slabs 12 are placed within the replacement area such that the female slabs 12 contact the subbase uniformly so as not to disrupt the subbase or damage the female slabs 12. During placement, each male slab 10 is lowered vertically to the exact location required to match the existing adjacent female slabs 12. Care is taken to insure that the male connectors 26 of the male slab 10, along the longitudinal and transverse sides of the male slab 10, are lowered over the female sockets 32 along the longitudinal and transverse sides of the adjacent female slabs 12, respectively. As the male slab 10 is lowered vertically, care must be taken to ensure that the male connectors 26 are set within their respective female sockets 32 of the adjacent existing female slabs 12.

After the male slabs 10 are placed in position adjacent to the female slabs 12, and all of the male connectors 26 are properly positioned within their corresponding female sockets 32, the spaces formed by the channels 40 on the bottom surface of the male slabs 10 and female slabs 12 are then injected from the top surface of the slabs through the grout holes 42 with binder material, such as grout including cement, water and fly ash, or in the alternative with a polymer foam material. The binder material is injected into the channels 40 to ensure that all voids existing between the bottom surfaces of the male slabs 10 and female slabs 12 and the subbase (not shown), regardless of size, are filled. The slabs should be monitored during injection of the binder material to ensure they are not vertically displaced due to the upward pressure created thereunder.

The female sockets 32 are then filled from the top surface of the slabs with a binder material such as early high-strength cement grout, thereby rigidly fastening each male connector 26 within its corresponding female socket 32. Following the filling of the female sockets 32, or simultaneously therewith, the keyways 100 are also filled with a binder material 106, such as early high-strength cement grout, by pouring the binder material through slot opening 102 until the central groove 104 and slot opening 102 are filled. When hardened and solidified, the binder material 106 rigidities the spacial relationship between adjacent slabs, particularly against any relative vertical movement between the adjacent slabs. It is desirable for the binder material in both the female sockets 32 and the keyways 100 to reach sufficient strength to transfer load from one slab to the other before opening the slabs to traffic.

In a preferred embodiment, high early strength grout is used in order to fill the channels 40 and voids underneath the male slabs 10 and female slabs 12, as well as the socket fixtures 32 and keyways 100. This type grout allows the slabs to be in service within the shortest period of time. Preparation of the subbase and placing of the slabs can take place around the clock as this type of work may be done with the aid of flood lighting and thus repairs can be completed in the shortest period of time.

When assembled, and with the male connectors 26 fixed in place in female sockets 32 by the high strength grout or the like, the present invention provides a precast concrete slab system in which reinforcing steel rods or other elongated reinforcement can extend continuously both longitudinally (the X direction) and transversely (the Y direction) throughout the slab system. More specifically, starting with the rods 18 of the male slabs 10, the rods 18 terminate in projections 20 forming male connectors 26 which fit into corresponding female sockets 32. The sockets 32 are, in turn, attached to rebars 36 which extend through the female slab 12 and are rigidly attached to a corresponding female socket 32 on the opposite side of the female slab 32. The female socket 32 on the opposite side of the slab 12 receives the male connector 26 of the next male slab 10 which projects from a reinforcing rod 18 of the next male slab 10. This progression is repeated throughout the slab system to provide continuous reinforcement throughout in both the longitudinal and transverse directions.

Without intending to be limiting, the male and female slabs 10 and 12 in accordance with the present invention can be as small as 4 feet by 4 feet square, or 4 feet by 8 feet rectangular, and as large as 25 feet by 25 feet square and 20 feet by 40 feet rectangular. The reinforcing rods 18 for the male slabs 10 are typically round with approximately a 1 inch diameter. Preferably, these 1 inch round rods are placed apart between about 2 to about 3 feet on center. In order to provide similar strength characteristics for the female slab 12, utilizing a pair of round rebar rods 36 for each female socket 32, the rods 36 would typically be about ¾ inch in diameter. Obviously, the female sockets 32 would be spaced apart in the female slabs 12 the same distance as the rods 18 in the male slabs 10. As would be readily understood by those skilled in the art, the size of the slabs 10 and 12, the spacing of the rods 18 and sockets 32, and the sizing and material of the reinforcing rods 18 and 36 can be varied by the design and intended use of the slab system in accordance with the present invention.

Typical dimensions for the female connector socket or socket fixture 32 would be as follows. The length of the fixture along its major axis could be about 200 mm and a vertical height of about 128 mm. The slot 44 could be about 33 mm wide, while the enlarged chamber 46 and channel 50 could have a diameter of about 73 mm. In this size socket, the male connectors 26 would most preferably extend about 7-8 inches from the side of the male slab 10.

The connectors 14 and continuous reinforcement system of the present invention, including the male connectors 26 and female socket fixtures 32 have the potential for use in other precast concrete structures which rely on interconnection between repeating precast components. Hence, it is not intended to limit the potential usages of the connection system of the present invention. For example, the connection system might be used to fasten lengths of concrete pipe or conduit.

Figure 17:
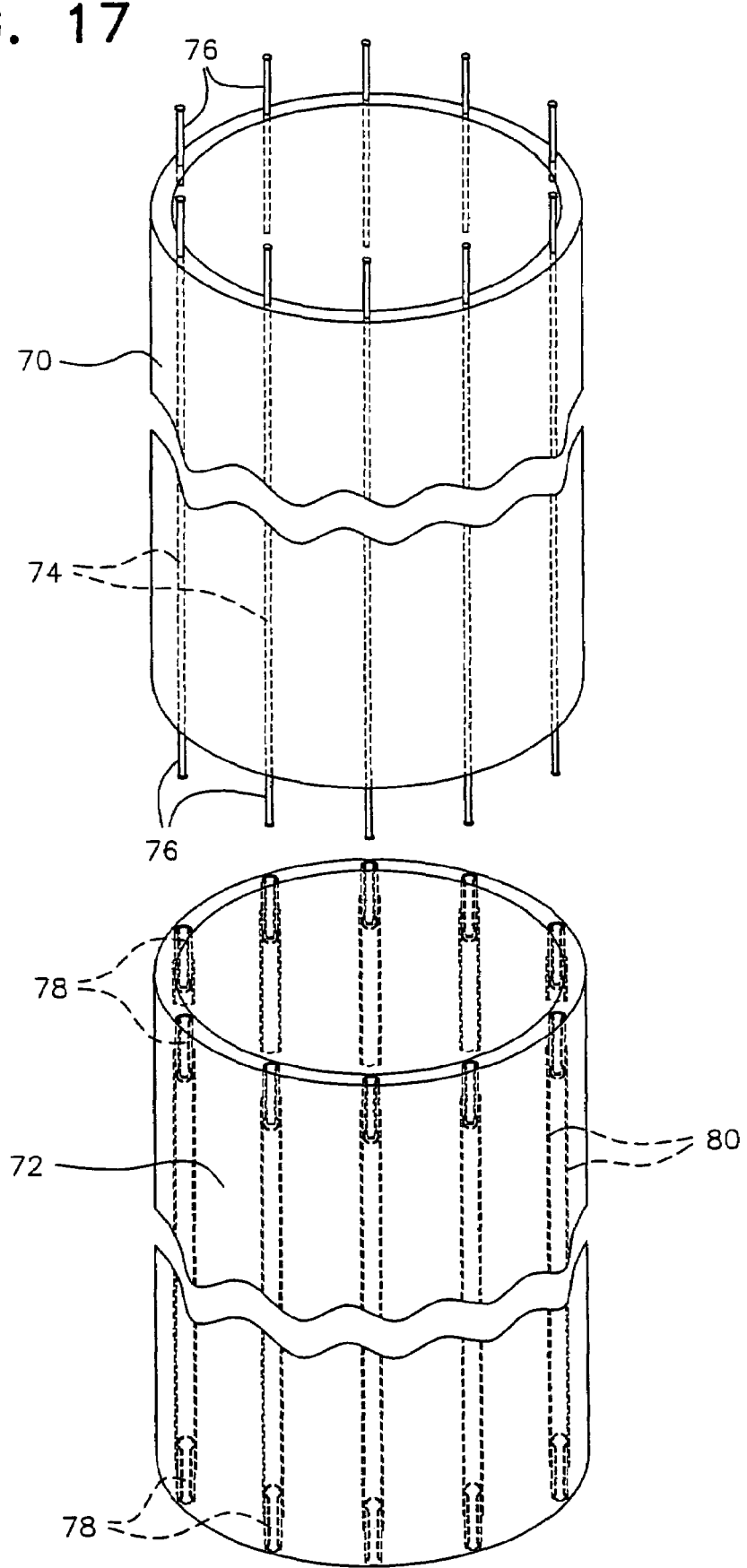
FIG. 17 shows a plan view of another embodiment incorporating the connector system of the present invention for a concrete pipe or conduit.

FIG. 17 shows a contemplated embodiment of this application illustrating two pipe sections, one male section 70 and one female section 72. It is contemplated that each male pipe section 70 would have a plurality of reinforcing rods 74 extending therethrough. Each reinforcing rod 74 would have projections extending beyond both ends of the pipe section to form a series of male connectors 76 projecting beyond both ends of the pipe section. Each female section 72 would have a series of socket fixtures 78, similar to female sockets 32, correspondingly positioned on each end to receive a male connector 76 therein. The open top of each socket fixture 78 would lie along the outer edge surface of the female section 72. Corresponding female sockets 78 on each end of the female pipe section 72 would be interconnected by a pair of reinforcing rebar rods 80 in the same manner as slabs 12.

In operation, the male connectors 76 would be of the threaded embodiment (shown in FIG. 8) and during installation would have no nuts 30 on the ends until after the two pipe sections were fitted together with the male projections inserted into the female sockets 78. After fitting, the nuts 30 would be threaded onto the projections to form the male connectors 76, and the sockets 78 then filled with grout to complete and rigidify the interconnection. The connection system of the present invention would thus form continuous reinforcement throughout the longitudinal extent of the concrete pipe or conduit.

Figure 18:
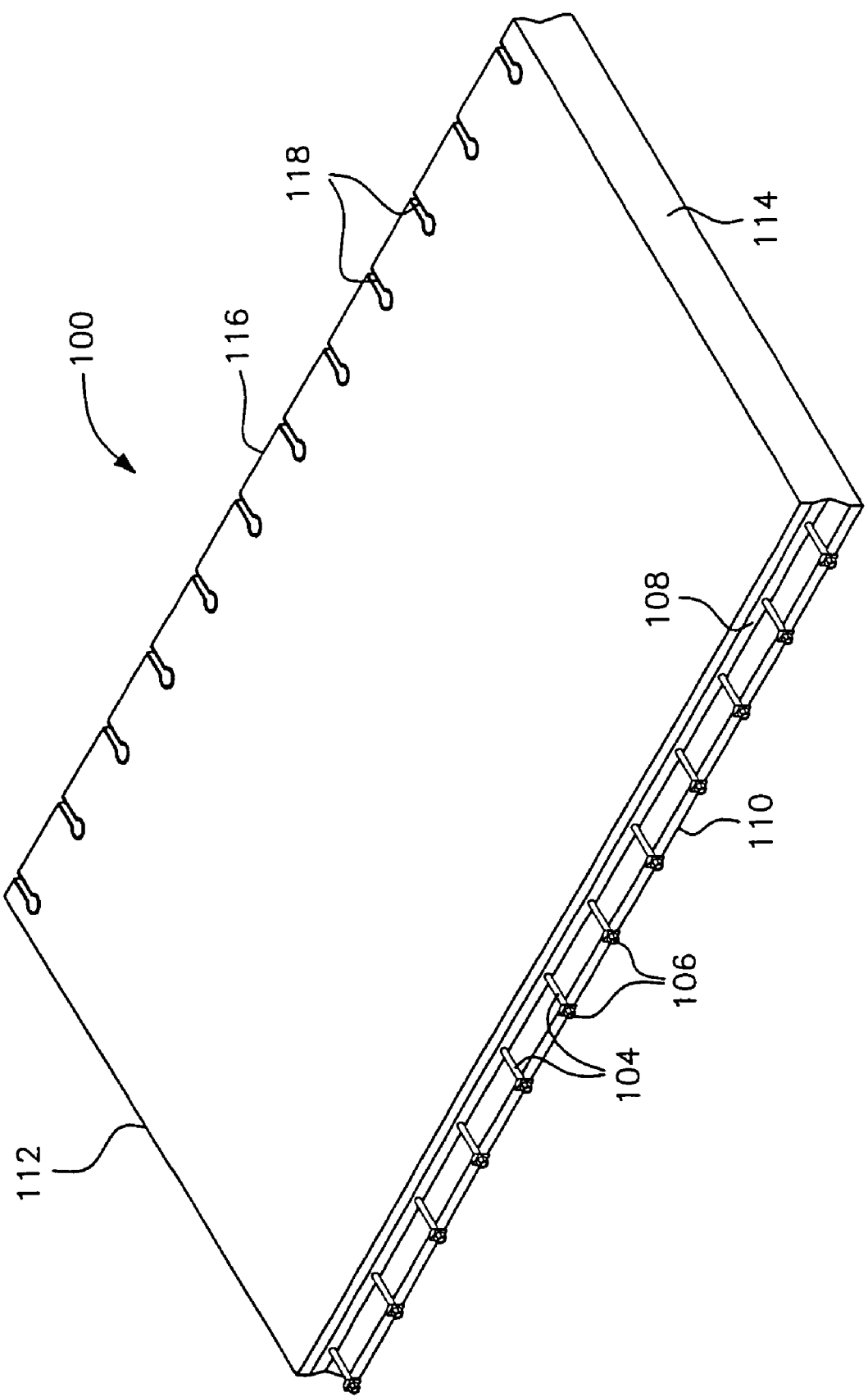
FIG. 18 is a perspective view of a slab having male and female connection components in accordance with a second embodiment of the present invention.

According to a second and preferred embodiment of the present invention, the slabs are not formed in two types, i.e., as male slabs and female slabs. Rather, as shown in FIG. 18, each slab, generally designated by the reference numeral 100, incorporates one or both of these connection components, as will now be more fully described.

As will be evident, many aspects of the first embodiment will also apply to the second embodiment and, therefore, in the interest of avoiding duplication, will not be repeated. However, it is to be understood that all features of the first embodiment that may be incorporated into the second embodiment are considered and are intended to be within the scope of the present invention.

Figure 19:
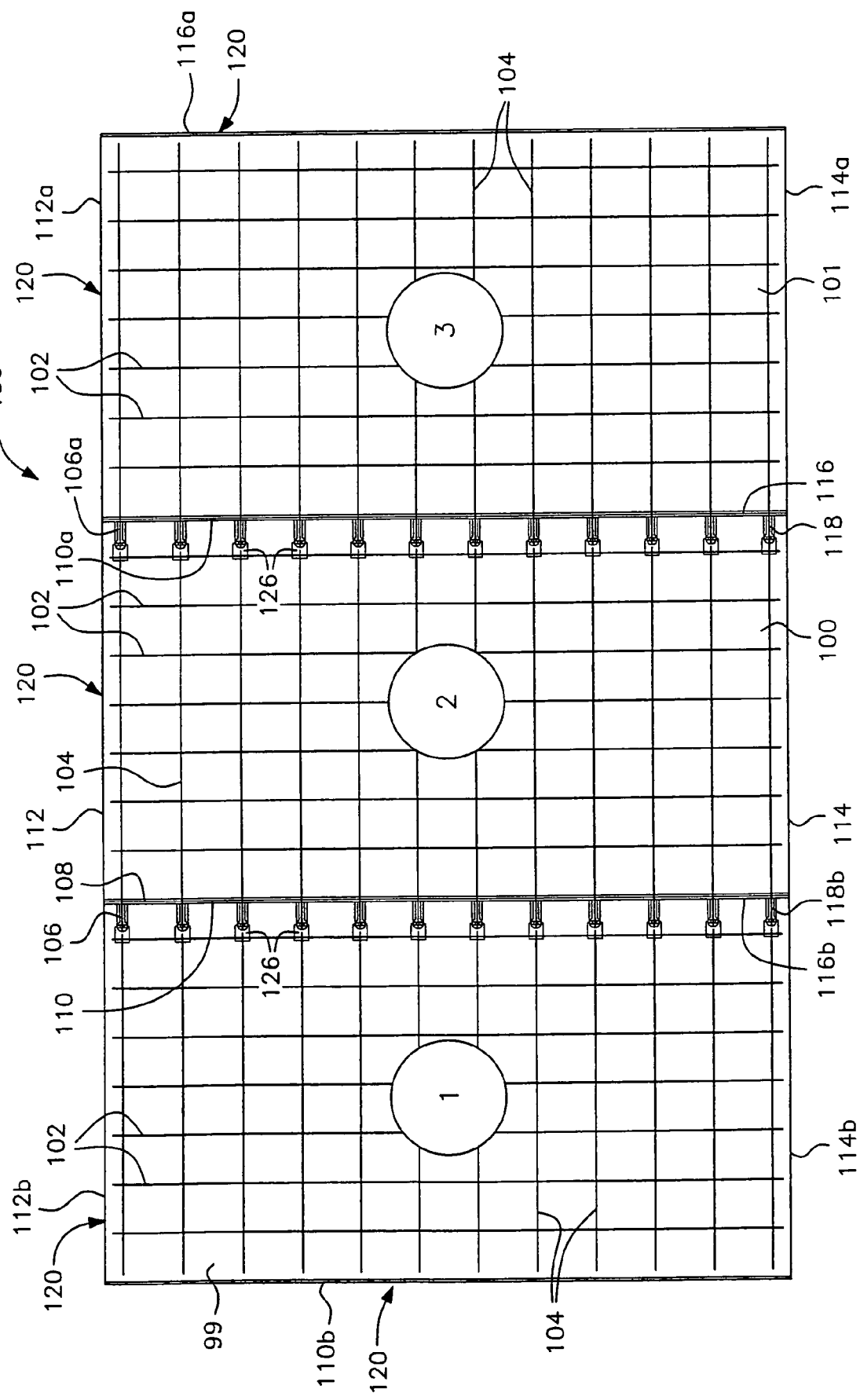
FIG. 19 shows a top plan view of the slab of FIG. 18, connected on two sides with adjoining slabs constructed in accordance with the second embodiment.

Each slab 100 has a plurality of reinforcing elements 102 and 104 which extend horizontally through the slab in both the longitudinal and transverse directions, respectively, generally perpendicularly to each other, as depicted in FIG. 19. Male connectors 106 are formed on a first side 108 of the slab 100 when the transverse reinforcing elements 104 project beyond the edge 110 on the first side 108. Similarly, male connectors could be formed on either of the lateral edges 112 and 114, as a second side, in the event that the longitudinally extending reinforcing elements 102 were to project beyond one of these edges 112 and 114. Hence, male connectors 106 are formed on adjacent first and second sides of the slab when both the longitudinally extending and transverse reinforcing elements 102, 104 project beyond the edges of both the first and second sides.

Opposing side edges of the first and second sides may be made smooth or "finished" if the reinforcing elements do not extend beyond the edges and do not include female socket fixtures. Alternatively, as shown in FIG. 18, the opposing side edge 116 may be constructed to include a plurality of spaced female socket fixtures 118. The choice of construction, i.e., whether the opposing side is finished or includes female fixtures, depends upon the intended placement of the slab within an assembled slab system such as that shown in FIG. 19 and generally designated by the reference numeral 150.

As shown in FIG. 19, in an assembled slab system 150 of three slabs 99, 100, 101 placed side by side, the middle slab 100 has a plurality of projecting male connectors 106 on the left lateral edge 110, formed by the transversely extending reinforcing elements 104 projecting beyond such left lateral edge 110, and is provided with female socket fixtures 118 along the right lateral edge 116. The longitudinally extending reinforcing elements 102, by contrast, do not project beyond either lateral edge 112, 114, resulting in a finished edge, generally designated by the reference numeral 120, for the overall slab system 150.

Similarly, the rightmost slab 101 in FIG. 19 has a plurality of projecting male connectors 106a on the left lateral edge 110a thereof, formed by the transversely extending reinforcing elements 104 projecting beyond such left lateral edge 110a. These male connectors 106a are received in the female socket fixtures 118 along the right lateral edge 116 of the middle slab 100. As the rightmost slab 101 is an end slab in the row-type construction of system 150, the transversely extending reinforcing elements 104 are not provided with female socket fixtures on the right lateral edge 116a and do not extend therebeyond, resulting in a finished edge 120. Also, like in the middle slab 100, the longitudinally extending reinforcing elements 102 do not project beyond either lateral edge 112a, 114a, providing two more finished edges 120.

In the leftmost slab 99 in FIG. 19, which is also an end slab, the transversely extending reinforcing elements 104 are provided with female socket fixtures 118b along the right lateral edge 116b which receive the male connectors 106 of the middle slab 100. On the remaining three sides 110b, 112b, 114b, the reinforcing elements 102, 104 terminate short of the edges, providing corresponding finished edges 120.

According to the second embodiment, and as generally shown in FIG. 19, each female socket fixture includes a coupling structure, generally designated by the reference numeral 126, by which it is coupled to a single reinforcing element that is aligned therewith within the supporting slab. The coupling structure 126 provides a simplified method of securing the female socket fixtures 118 to the reinforcing element infrastructure 102, 104 within the slabs 99, 100, 101, thus eliminating the need for the two reinforcing bars on either side of the female socket fixture as in the first embodiment. The coupling structure 126 also allows a single reinforcing element 102, 104 to both stabilize a respective female socket fixture 118 and, as appropriate to the slab location within a given assembled slab structure, serve as a male connector 106 on the opposing slab edge. This facilitates the male/female reinforcing steel continuity, increases manufacturing efficiency and reduces material costs.

Figure 25:
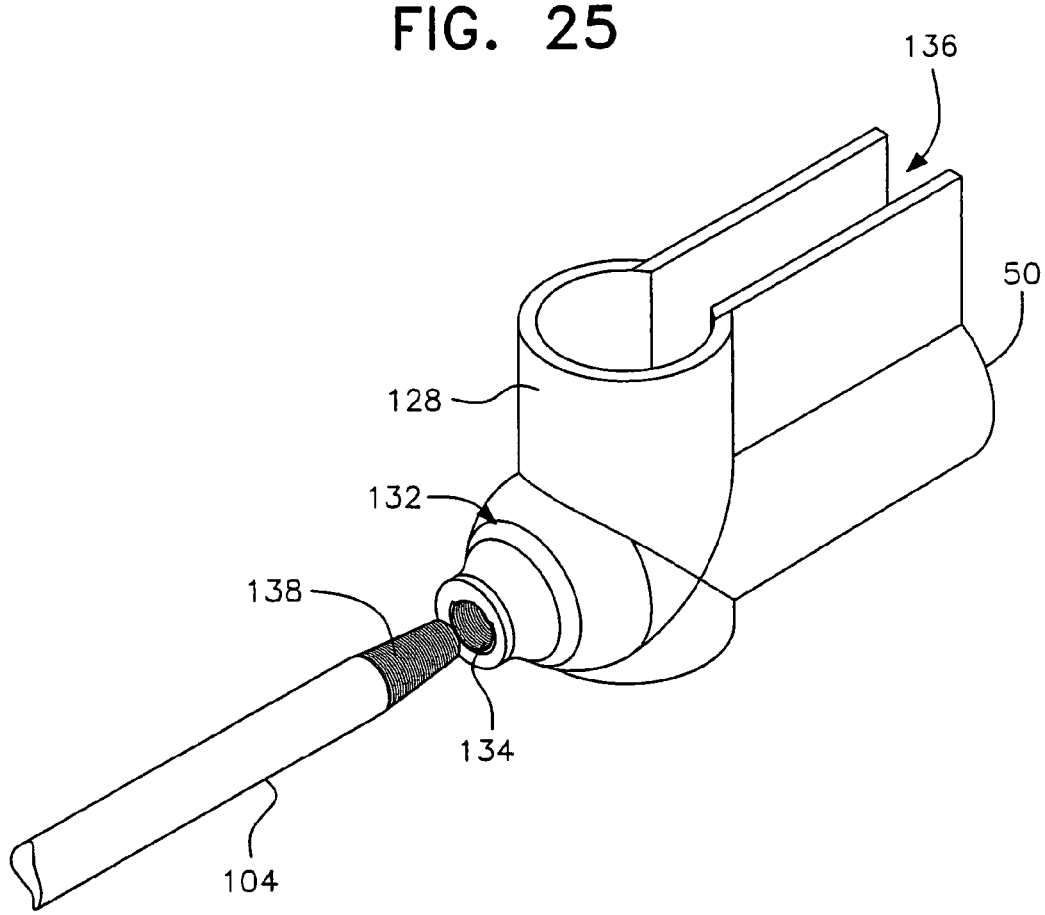
FIG. 25 is a perspective view of a female socket fixture having an alternative socket addition in accordance with the second embodiment of the present invention.

More particularly, the female socket fixture 118 includes a coupling structure 126 on the closed end portion 128 of the fixture to which a corresponding reinforcing element 102, 104 in the slab is connected. The coupling structure 126 may be embodied as a socket addition 130, as shown in the three perspective views of FIGS. 20-22, as well as the schematic views of FIGS. 23 and 24A-F. An alternative socket addition configuration, generally designated by the reference numeral 132, is shown in FIG. 25. The socket additions 130, 132 are preferably cast with the socket fixture 118, although subsequent coupling thereof to an existing socket fixture, such as those shown in FIGS. 6, 8 and/or 16, would also be possible.

As shown in FIGS. 22, 24A, 24B and 25, the socket additions 130, 132 have a threaded and tapered opening 134 that is in alignment with the keyhole opening 136 but which faces generally in the opposite direction. The socket opening 134 in the socket additions 130, 132 receives a correspondingly threaded and tapered end 138 of a reinforcement element 102, 104, such as that shown in FIG. 25.

Figure 26:
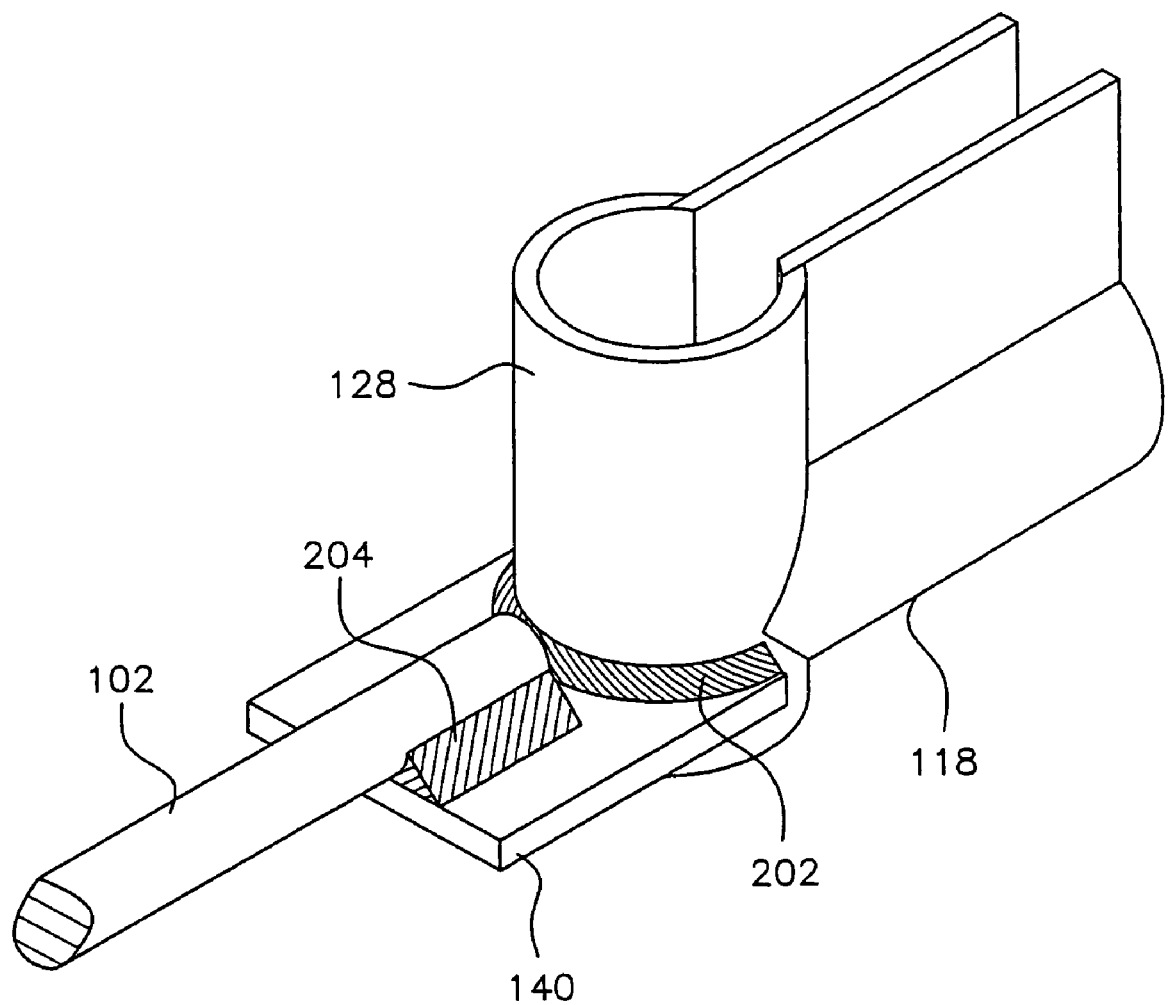
FIG. 26 is a perspective view of a female socket fixture having a welding support plate in accordance with the second embodiment of the present invention.
Figure 26A:
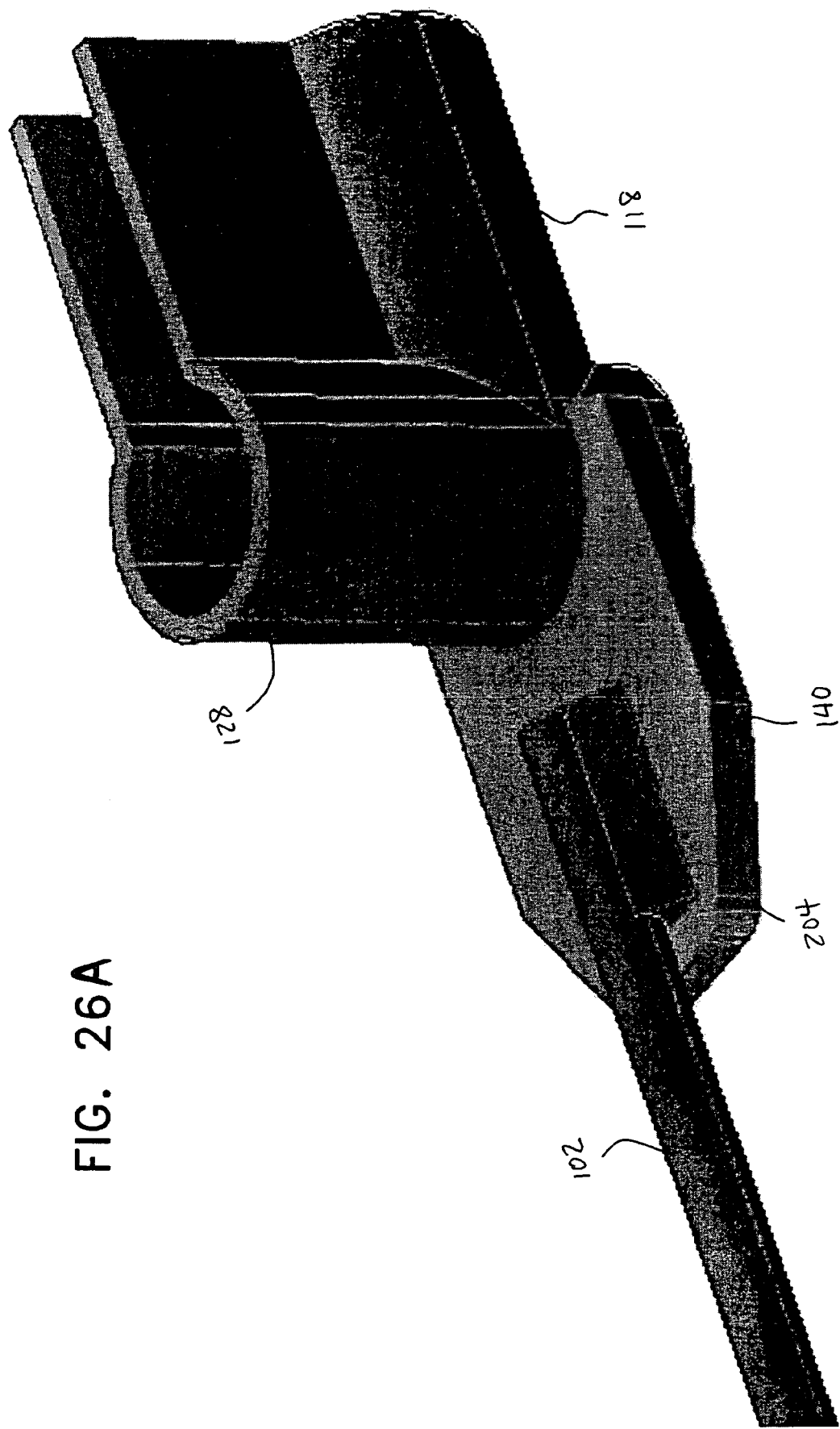
FIG. 26A is a perspective view of an alternative embodiment of the female socket fixture of FIG. 26, in which the support plate is integrally cast with the female coupler casting.

Alternatively, as shown in FIG. 26, the coupling structure 126 may be embodied as a support plate 140 welded to the closed end portion 128 of socket fixture 118, to which the reinforcing element 102, 104 is also welded at 204. The support plate 140 may be welded to the fixture 118 as at 202, or integrally cast as a foundry piece therewith as shown in FIG. 28. As coupled on the support plate 140, the reinforcing element 102, 104 is similarly aligned with the female fixture 118 as in the threaded socket additions 130, 132.

Figure 20:
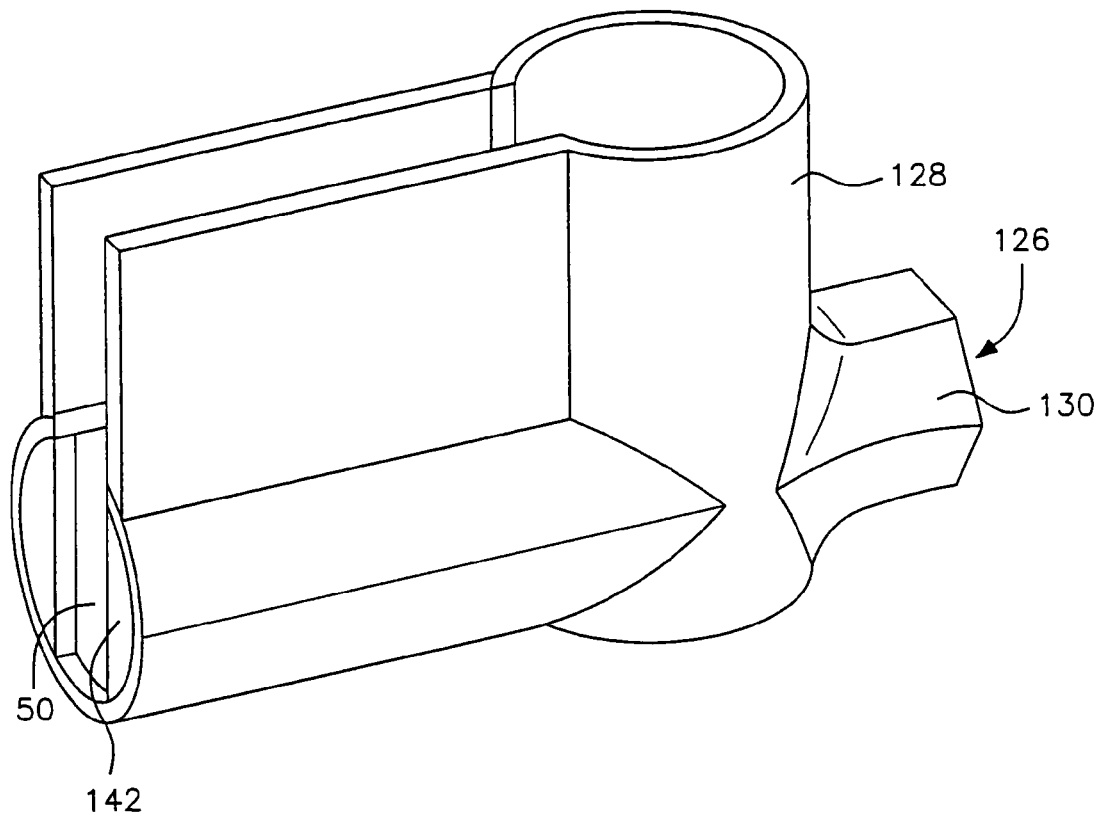
FIG. 20 is a side perspective view of a female socket fixture cast with a socket addition in accordance with the second embodiment of the present invention.
Figure 21:
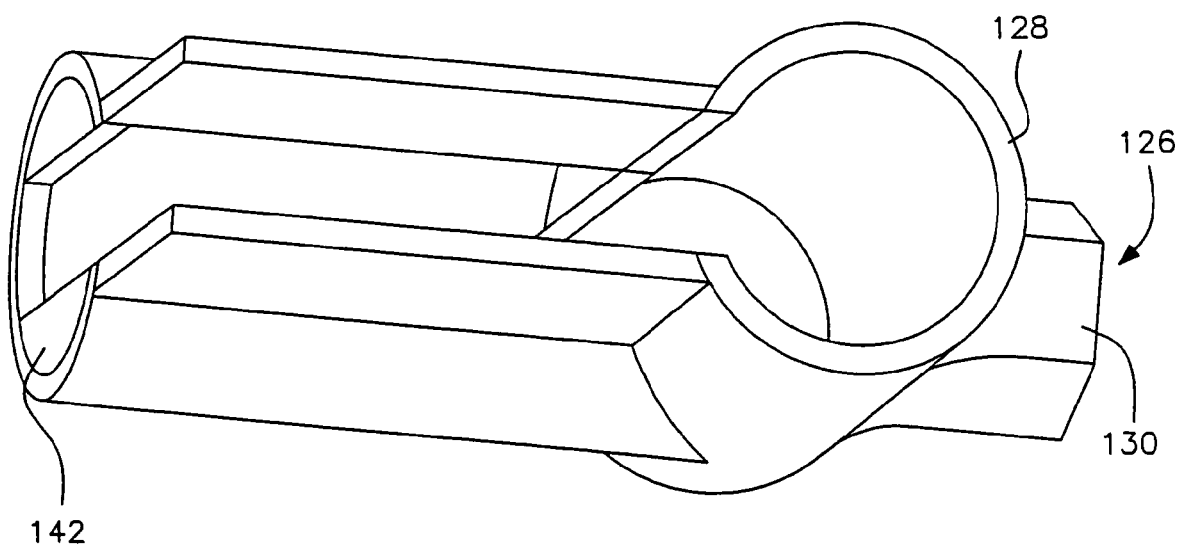
FIG. 21 is a top perspective view of the female socket fixture of FIG. 20.
Figure 22:
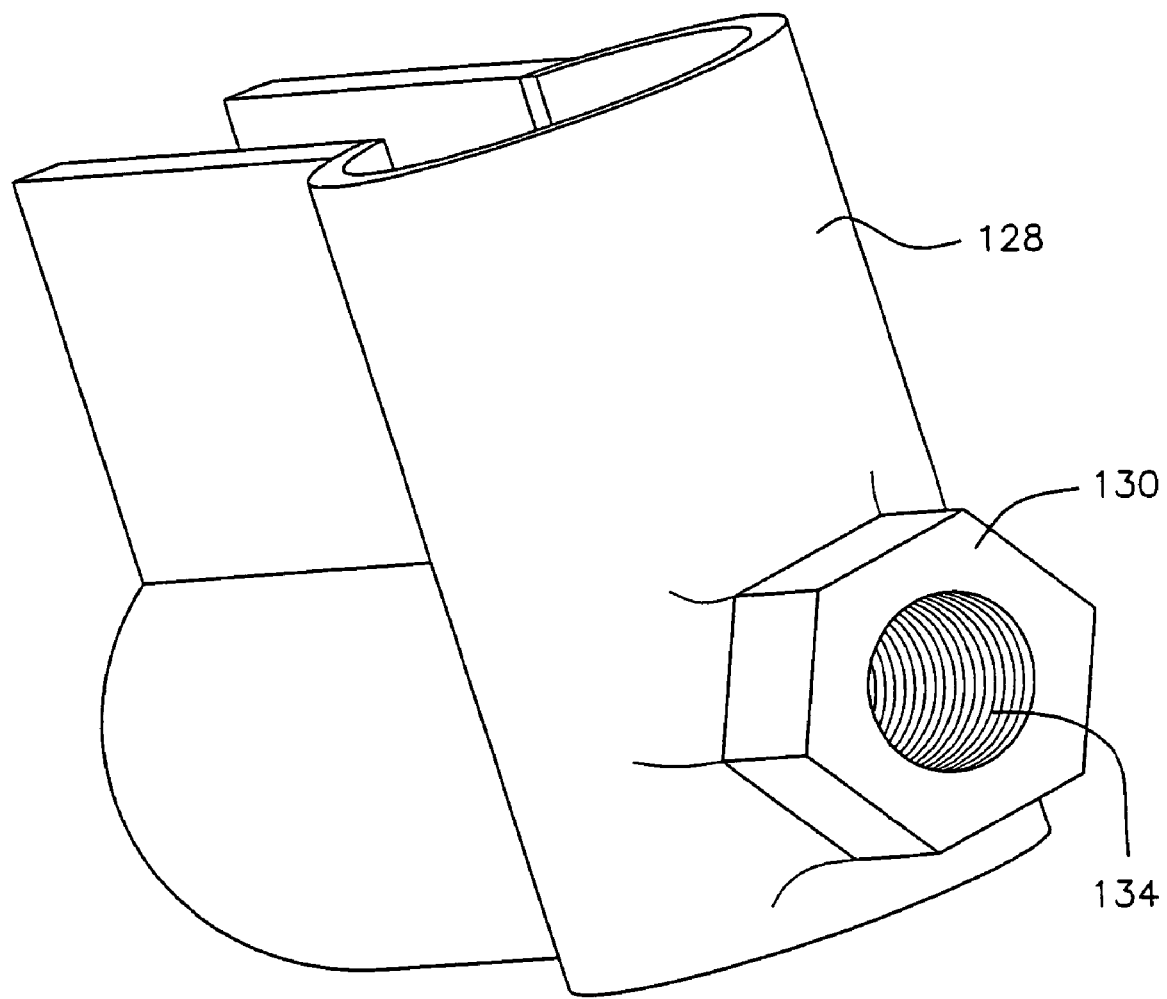
FIG. 22 is a rear perspective view of the female socket fixture of FIG. 20.
Figure 23:
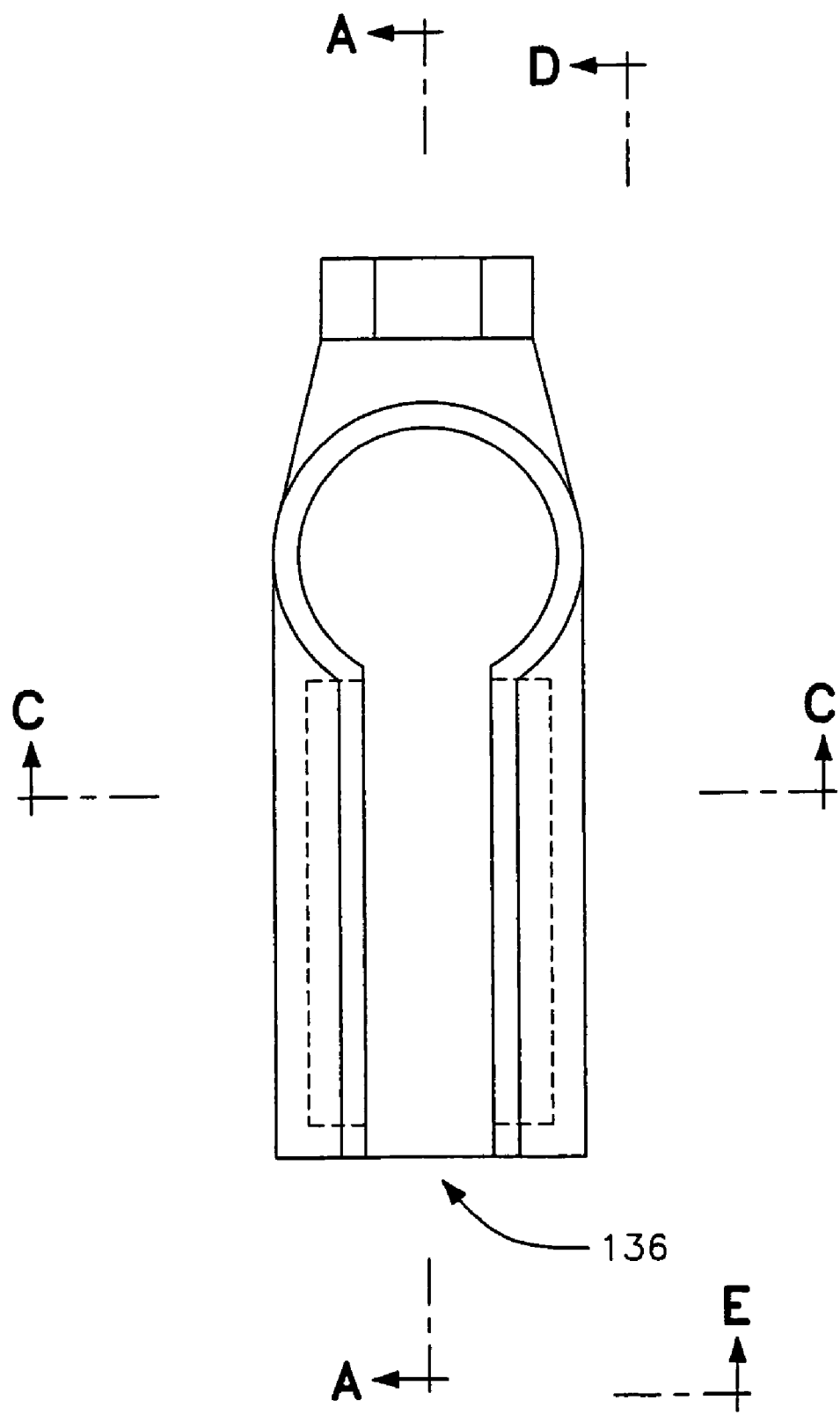
FIG. 23 is a top plan view of the female socket fixture of FIG. 20.
Figure 24A:
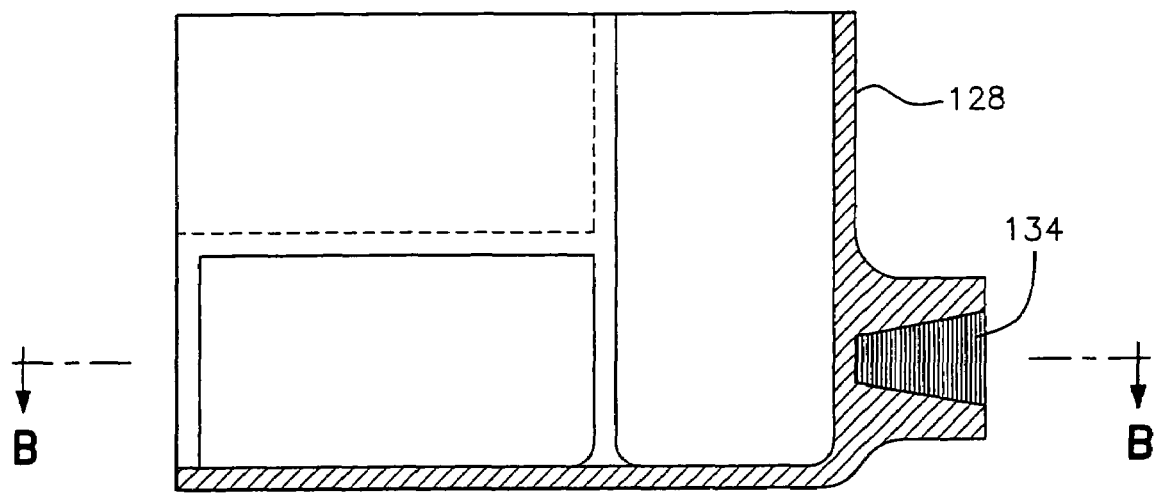
FIG. 24A is a cross-sectional view taken along line A-A of FIG. 23.
Figure 24B:
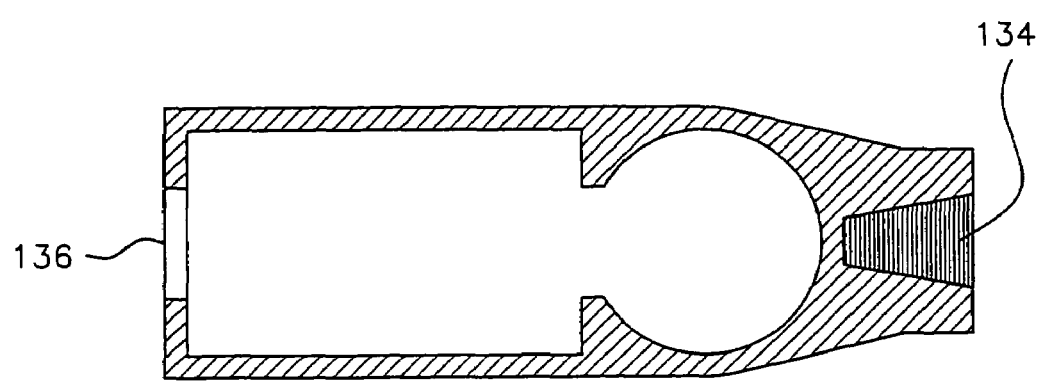
FIG. 24B is a cross-sectional view taken along line B-B of FIG. 24A.
Figure 24C:
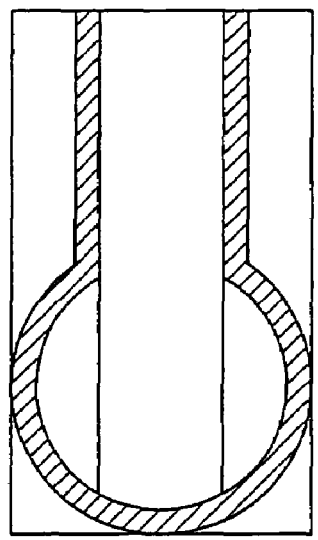
FIG. 24C is a cross-sectional view taken along line C-C of FIG. 23.
Figure 24D:
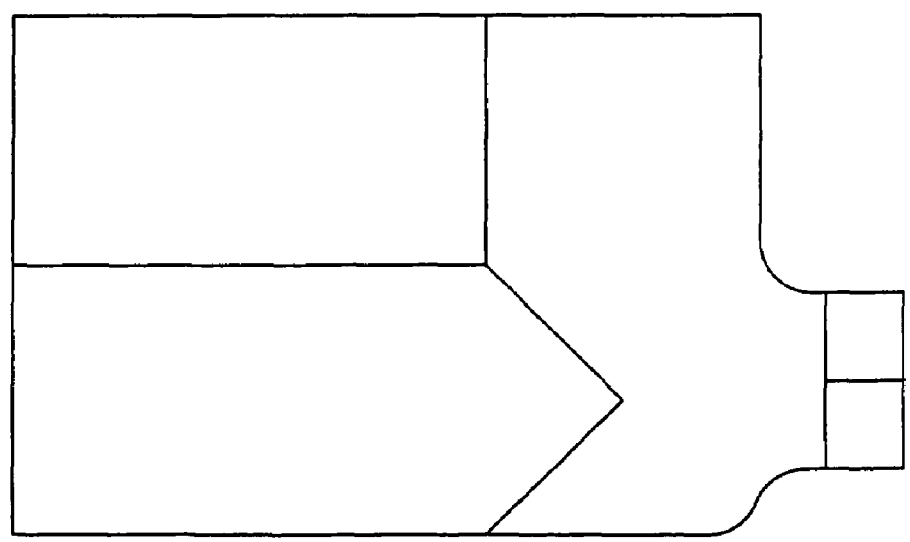
FIG. 24D is a side elevation as viewed along line D of FIG. 23.
Figure 24E:
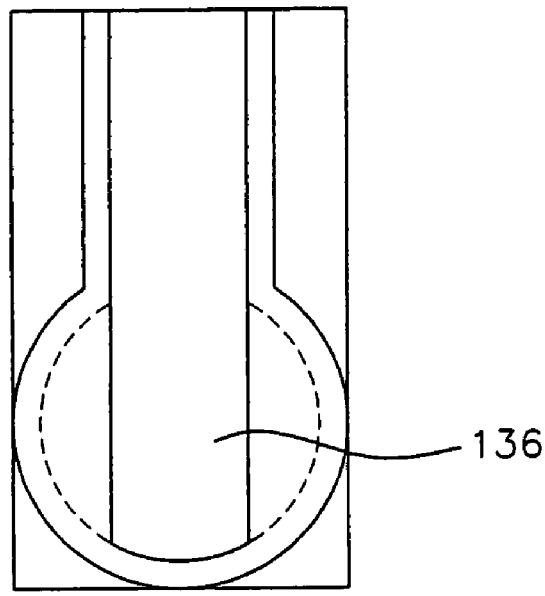
FIG. 24E is a front elevation as viewed along line E of FIGS. 23 and 24D.
Figure 24F:
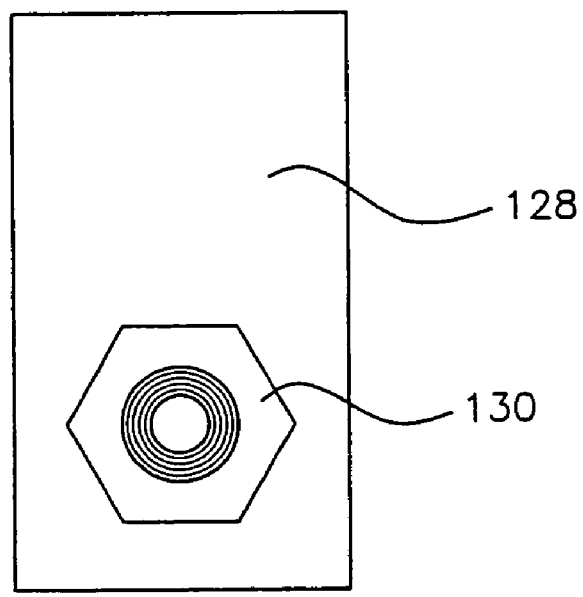
FIG. 24F is a rear elevation as viewed along line F of FIG. 24D.

In addition to the coupling structure 126, FIGS. 20 and 21 also illustrate the internal lugs 142 which are preferably formed at the open end of the channel 50 of the female fixture 118. These lugs 142, also shown in FIG. 7, help to center the male connectors 106 of an adjoining slab as they are inserted within the channel 50 when connecting the slabs together into a slab assembly 150.

As with the first embodiment, to connect the slabs the male connectors 106 along at least one side edge of a first slab are received through the socket fixture openings in corresponding female socket fixtures along at least one side edge of a second slab. With the addition of solidified filler in the female socket fixtures, the male connectors are rigidly fixed in the female socket fixtures and provide continuous reinforcement between the reinforcing elements of the first and second slabs.

Figure 27:
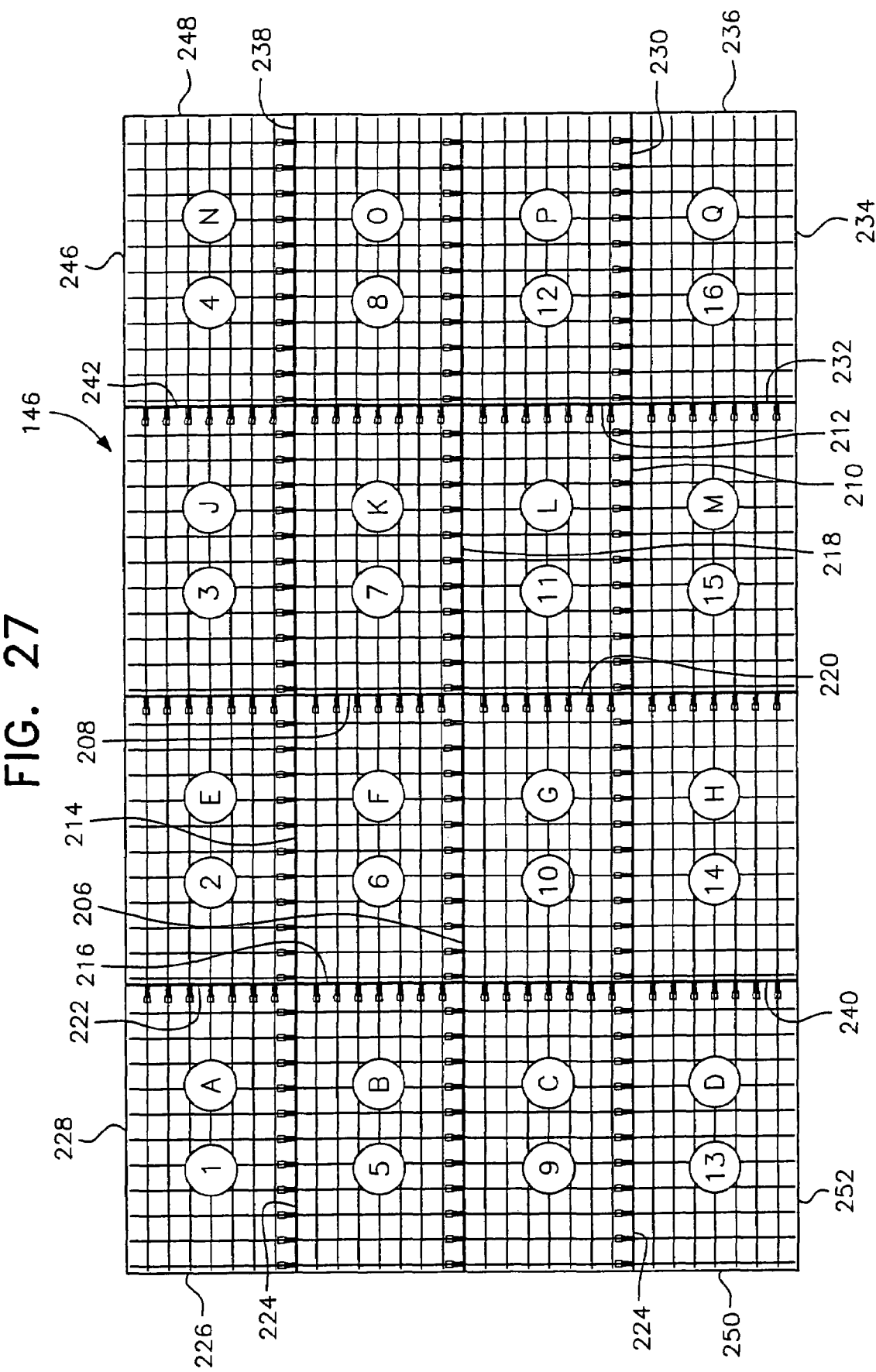
FIG. 27 is a top plan view of an assembled section of a precast concrete slab system in accordance with the second embodiment of the present invention.

When connecting a plurality of slabs together in a matrix-type arrangement, the second embodiment can provide for greater ease of installation. Instead of placing all of the female slabs first, in a checkerboard fashion, and then drop-fitting the male slabs in between the initially installed female slabs, as in the first embodiment, the matrix can be erected in a linear sequence in both the X and Y directions, as shown in FIG. 27. This structure and installation procedure reduces the likelihood of alignment difficulties as may otherwise arise in the checkerboard assembly from the installation of female slabs that are slightly off in dimensional placement.

As designated by the circled numbers and letters within the matrix unit of slabs, generally designated by the reference numeral 146, shown in FIG. 27, installing a slab unit 146 according to the second embodiment requires only the sequential placement of the slabs, whether in rows according to the numbers, or in columns according to the letters. Other installation sequences are also possible, resulting in significant versatility in arrangement of the slabs.

The method for assembling a precast concrete slab system according to the second embodiment may be summarized as follows. First, at least a first rectangular concrete slab having reinforcement elements extending therethrough and having a plurality of female socket fixtures spaced along at least a first side edge, is positioned on a roadbed. Second, at least one adjoining rectangular concrete slab, having a plurality of reinforcing elements extending to project beyond at least the adjoining side edge to form spaced male connectors, is positioned adjacent the first side edge of the first slab such that the spaced male connectors are received in respective spaced female socket fixtures. Finally, each of the female socket fixtures having a respective male connector received therein is filled with a binder material which, when solidified, fixes the male connectors in the female socket fixtures and provides continuous reinforcement between the reinforcing elements of the two slabs. This placement of slabs may be continued in sequence to form a matrix of virtually any size, as additional slabs having male connectors on one side edge and female connectors on the opposite side edge are fitted into the female fixtures of a previously placed slab while, at the same time, providing available fixture openings on such opposite side for the next slab to be placed. In the final row or column of slabs, slabs having a finished edge on the opposite side provide a smooth and attractive closure to the matrix unit 146.

FIG. 27 also shows the variety of male and female connector combinations within the slabs. For example, internal slabs such as those marked with "6F" and "11L" each have two adjacent sides 206, 208 and 210, 212, respectively, fitted with female socket fixtures, and two opposing adjacent side edges 214, 216 and 218, 220, respectively, with projecting male connectors. Corner slab "1A" has two sides 222, 224 fitted with female socket fixtures and two finished edges 226, 228, corner slab "16Q" has two sides 230, 232 with projecting male connectors and two finished edges 234, 236, while corner slabs "4N" and "13D" each have one side 238 and 240, respectively, fitted with female socket fixtures, one side 242 and 244, respectively, with projecting male connectors, and two finished edges 246, 248 and 250, 252, respectively. Similar variable combinations of male connectors, female fixtures and finished edges may be seen in the edge slabs "2E", "3J", "5B", "9C", "8O", "12P", "14H" and "15M". As illustrated, using the same set of components, i.e., reinforcing members of each slab coupled to female socket fixtures, a highly variable assembly set may be constructed and installed efficiently and cost-effectively.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed is:

1. A prefabricated concrete slab system comprising:
a plurality of prefabricated rectangular concrete slabs, each slab having a plurality of reinforcing elements extending longitudinally and transversely therethrough, said plurality of reinforcing elements in at least a first slab projecting beyond one or more side edges of said first slab to form spaced male connectors, and at least a second slab having a plurality of female socket fixtures spaced along one or more side edges of said second slab, said female socket fixtures open on a top surface of said second slab;
said male connectors along at least one side edge of said first slab being received in corresponding female socket fixtures along at least one side edge of said second slab through said socket fixture openings; and
solidified filler in said female socket fixtures rigidly fixing said male connectors in said female socket fixtures and providing continuous reinforcement between said reinforcing elements of said first and second slabs.

2. The prefabricated concrete slab system of claim 1, wherein said female socket fixtures of said second slab are coupled to the reinforcing elements that extend through said second slab in longitudinal alignment with said fixtures.

3. The prefabricated concrete slab system of claim 2, wherein said female socket fixtures include a screw socket for receiving a correspondingly threaded end of said reinforcing element.

4. The pre-fabricated concrete slab system of claim 2, wherein each of said female sockets includes a support plate to which a corresponding end of said reinforcing element is welded.

5. The prefabricated concrete slab system of claim 2, wherein said longitudinally aligned reinforcing elements project beyond an opposing edge of said second slab to form spaced male connectors opposite said female socket fixtures.

6. The prefabricated concrete slab system of claim 1, wherein said first slab includes a corresponding plurality of female socket fixtures spaced along an opposing side edge of said first slab relative to said male connectors, said projecting reinforcement elements being coupled to said corresponding plurality of female socket fixtures.

7. The prefabricated concrete slab system of claim 1, wherein a plurality of said prefabricated rectangular concrete slabs each have at least one side edge with a plurality of female socket fixtures spaced therealong, and an opposing side edge in which the reinforcing elements that extend through the slab in longitudinal alignment with said female socket fixtures project beyond said opposing side edge to form spaced male connectors.

8. The prefabricated concrete slab system of claim 7, wherein said longitudinally aligned reinforcing elements are coupled to an outer surface of said female socket fixtures, respectively, said outer surface facing said opposing side edge.

9. The prefabricated concrete slab system of claim 1, wherein said reinforcing elements are steel reinforcing rods.

10. The prefabricated concrete slab system of claim 1, wherein said male connectors each includes a projecting end of said reinforcing element with an enlargement thereon and each female socket fixture includes an enlarged chamber open at the top for receiving said male connector enlargement.

11. The prefabricated concrete slab system of claim 10, wherein said reinforcing element projecting end is threaded and said enlargement thereon is a threaded nut threadedly received on said projecting end.

12. The prefabricated concrete slab system of claim 10 wherein said open top of each said female socket fixture is in the general shape of a keyhole with an elongated slot open at the top and extending from said second slab side edge to said open enlarged chamber.

13. The prefabricated concrete slab system of claim 12 wherein said female socket fixture also has a generally keyhole shaped opening along said second slab side edge with said slot opening into a bottom channel for receiving said male connector projecting end when said male connector enlargement is received in said female socket fixture enlarged chamber, said female socket fixture of said second slab further including a structure opposite said keyhole shaped opening for coupling a corresponding reinforcing element of said second slab in general alignment with said elongated slot.

14. The prefabricated concrete slab system of claim 13 wherein said structure includes a screw socket for receiving a threaded portion of said corresponding reinforcing element.

15. The prefabricated concrete slab system of claim 13 wherein said structure includes a support plate to which said corresponding reinforcing element is welded.

16. The prefabricated concrete slab system of claim 13 wherein an entrance of said keyhole opening includes an internal lug formed on either side of said bottom channel.

17. The prefabricated concrete slab system of claim 1, wherein said first slab is a male slab in which said plurality of reinforcing elements respectively project beyond up to all four sides thereof.

18. The prefabricated concrete slab system of claim 1, wherein said second slab is a female slab having a respective plurality of female socket fixtures spaced along up to all four sides thereof.

19. The prefabricated concrete slab system of claim 1, wherein said first slab is one of a plurality of male slabs having male connectors and said second slab is one of a plurality of female slabs having female socket fixtures, said pluralities of male and female slabs being connected in a checkerboard arrangement of alternating male and female slabs.

20. A prefabricated concrete slab system comprising:
a plurality of prefabricated rectangular concrete slabs interlocking in a matrix arrangement such that said plurality of slabs includes internal slabs bounded on all sides by other slabs, and external slabs each having at least one free edge;
said internal slabs each having a plurality of reinforcing elements extending longitudinally and transversely therethrough, a first end of at least said longitudinally extending or said transversely extending reinforcing elements projecting beyond a first side edge of the respective slab to form spaced male connectors, and an opposite end of said reinforcing elements being connected to a corresponding plurality of female socket fixtures spaced along a second opposing side edge of the respective slab, said female socket fixtures being open on a top surface of said slab such that male connectors along a side edge of a first adjacent slab are received in said corresponding plurality of female socket fixtures through said socket fixture openings, while said male connectors of said respective slab are received in a further plurality of female socket fixtures spaced along a side edge of a second adjacent slab;
said external slabs each having a second plurality of reinforcing elements extending longitudinally and transversely therethrough, said second plurality of reinforcing elements having at least one end configured as either spaced male connectors or female socket fixtures along an interfacing slab edge so as to fit cooperatively with adjacent internal slabs and/or adjacent external slabs; and
solidified filler in said female socket fixtures rigidly fixing said male connectors in said female socket fixtures and providing continuous reinforcement between said reinforcing elements of adjacent slabs forming said matrix arrangement.

21. The prefabricated concrete slab system of claim 20 wherein each of said internal slabs includes spaced male connectors along two side edges and integral with said longitudinally and transversely extending reinforcing elements, and female socket fixtures spaced along two opposing side edges.

22. The prefabricated concrete slab system of claim 21 wherein each of said female socket fixtures is coupled to a respective one of said reinforcing elements at an end thereof opposite said male connectors.

23. A method for assembling a prefabricated concrete slab system which comprises the steps of:
positioning a first prefabricated rectangular concrete slab on a roadbed, said first slab having a plurality of female socket fixtures spaced along one or more side edges which socket fixtures are connected to reinforcing elements extending longitudinally and transversely through said first slab and are open on a top surface of said first slab;
positioning at least a second prefabricated rectangular concrete slab, said second slab having a plurality of reinforcing elements extending longitudinally and transversely therethrough and projecting beyond one or more side edges of said second slab to form spaced male connectors, such that said male connectors along one side edge of said second slab are received in corresponding female socket fixtures along one side edge of said first slab through said socket fixture openings; and
filling each of said female socket fixtures having said male connectors received therein with a binder material which, when solidified, fixes said male connectors within said female socket fixtures and provides continuous reinforcement between said reinforcing elements of said first and second slabs.

24. The method as set forth in claim 23, wherein said second slab has a second plurality of female socket fixtures spaced along a side edge of said second slab opposite said one side edge, said second plurality of female socket fixtures being connected to said second slab reinforcing elements that formed said male connectors, said method further including the steps of:
positioning at least a third prefabricated rectangular concrete slab, said third slab having a plurality of reinforcing elements extending longitudinally and transversely therethrough and projecting beyond one or more side edges of said third slab to form spaced male connectors, such that said male connectors along one side edge of said third slab are received in said second plurality of female socket fixtures along one side edge of said second slab; and
filling each of said female socket fixtures having said male connectors received therein with a binder material which, when solidified, fixes said male connectors within said female socket fixtures and provides continuous reinforcement between said reinforcing elements of said first, second and third slabs.

25. The method as set forth in claim 23, wherein said step of positioning a first slab having a plurality of female socket fixtures includes positioning a plurality of first slabs having respective pluralities of female socket fixtures as female slabs on a road bed in a spaced, checkerboard arrangement, said step of positioning a second slab having spaced male connectors occurring thereafter and including positioning a plurality of second slabs having respective pluralities of spaced male connectors as male slabs into said checkerboard arrangement in open spaces between said first slabs.

* * * * *